United States Patent [19]
Helf

[11] Patent Number: 5,924,064
[45] Date of Patent: *Jul. 13, 1999

[54] VARIABLE LENGTH CODING USING A PLURALITY OF REGION BIT ALLOCATION PATTERNS

[75] Inventor: Brant Helf, Brookline, Mass.

[73] Assignee: PictureTel Corporation, Andover, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/726,959

[22] Filed: Oct. 7, 1996

[51] Int. Cl.⁶ ..................................................... G10L 7/04
[52] U.S. Cl. .......................... 704/229; 704/204; 704/230; 704/500
[58] Field of Search .................................. 704/204, 229, 704/230, 500

[56] References Cited

U.S. PATENT DOCUMENTS

| | | | |
|---|---|---|---|
| 5,109,417 | 4/1992 | Fielder et al. | 704/205 |
| 5,142,656 | 8/1992 | Fielder et al. | 704/229 |
| 5,185,800 | 2/1993 | Mahieux | 704/500 |
| 5,222,189 | 6/1993 | Fielder | 704/229 |
| 5,230,038 | 7/1993 | Fielder et al. | 704/229 |
| 5,301,205 | 4/1994 | Tsutsui et al. | 375/200 |
| 5,317,672 | 5/1994 | Crossman et al. | 395/238 |
| 5,479,562 | 12/1995 | Fielder et al. | 704/229 |
| 5,530,750 | 6/1996 | Akagiri | 380/4 |
| 5,583,962 | 12/1996 | Davis et al. | 704/229 |
| 5,583,967 | 12/1996 | Akagiri | 704/229 |
| 5,664,056 | 9/1997 | Akagiri | 704/229 |
| 5,664,057 | 9/1997 | Crossman et al. | 704/229 |

FOREIGN PATENT DOCUMENTS

WO 95/02240  1/1995  WIPO ............................ G10L 9/00

OTHER PUBLICATIONS

Sadaoki Furui, Digital Speech Processing, Synthesis, and Recognition, Marcel Dekker, Inc. p. 139, 1989.

*Primary Examiner*—David R. Hudspeth
*Assistant Examiner*—Tālivaldis Ivars Šmits
*Attorney, Agent, or Firm*—Fish & Richardson P.C.

[57] ABSTRACT

Samples of an audio signal are converted into grouped frames of transformed transform coefficients, each frame having a plurality of regions (subbands). The power in each region is determined, quantized and encoded. A predetermined number of categorizations are applied to the transform coefficients in the plurality of regions. Each categorization assigns to each one of the regions a selected one of a plurality of different scalar nonuniform quantization step sizes. The step size is selected in accordance with the quantized power in the region and the quantized powers in all the regions. The quantized power encoded transform coefficients and an identification of the selected categorization are variable-length encoded and transmitted to a decoder. During decoding, the power of the transform coefficients in each of the regions is reconstructed from the quantized and encoded power. The selected one the categorizations used by the encoder is determined from the transmitted identification thereof. The quantization step size for each region is determined from the determined categorization and the transmitted quantized power. The quantized and encoded transform coefficients are reconstructed into transform coefficients from the determined step size. The reconstructed transform coefficients are transformed into the audio signal.

16 Claims, 9 Drawing Sheets

Microfiche Appendix Included
(1 Microfiche, 27 Pages)

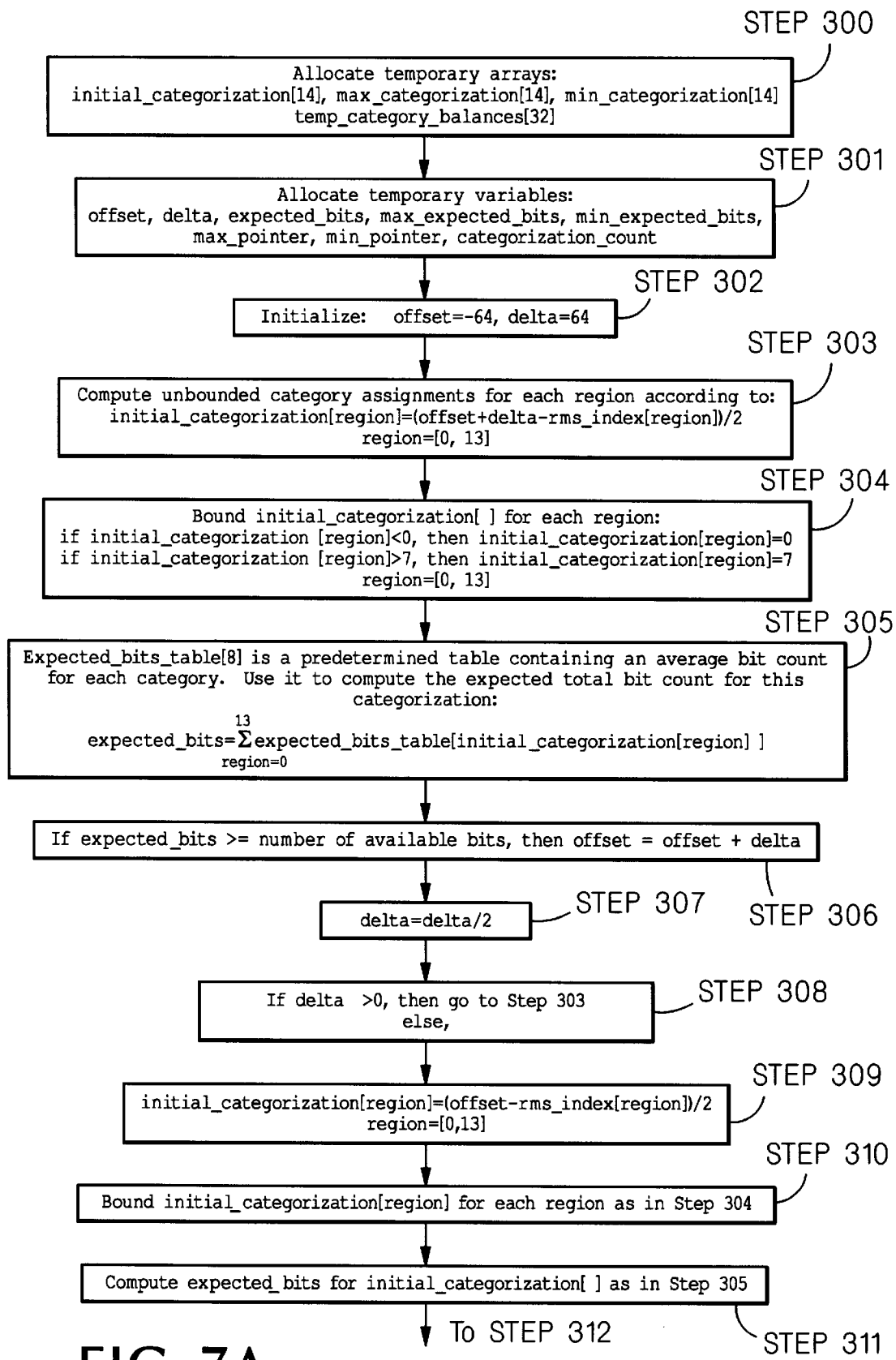
FIG. 7A (FIG. 7B)

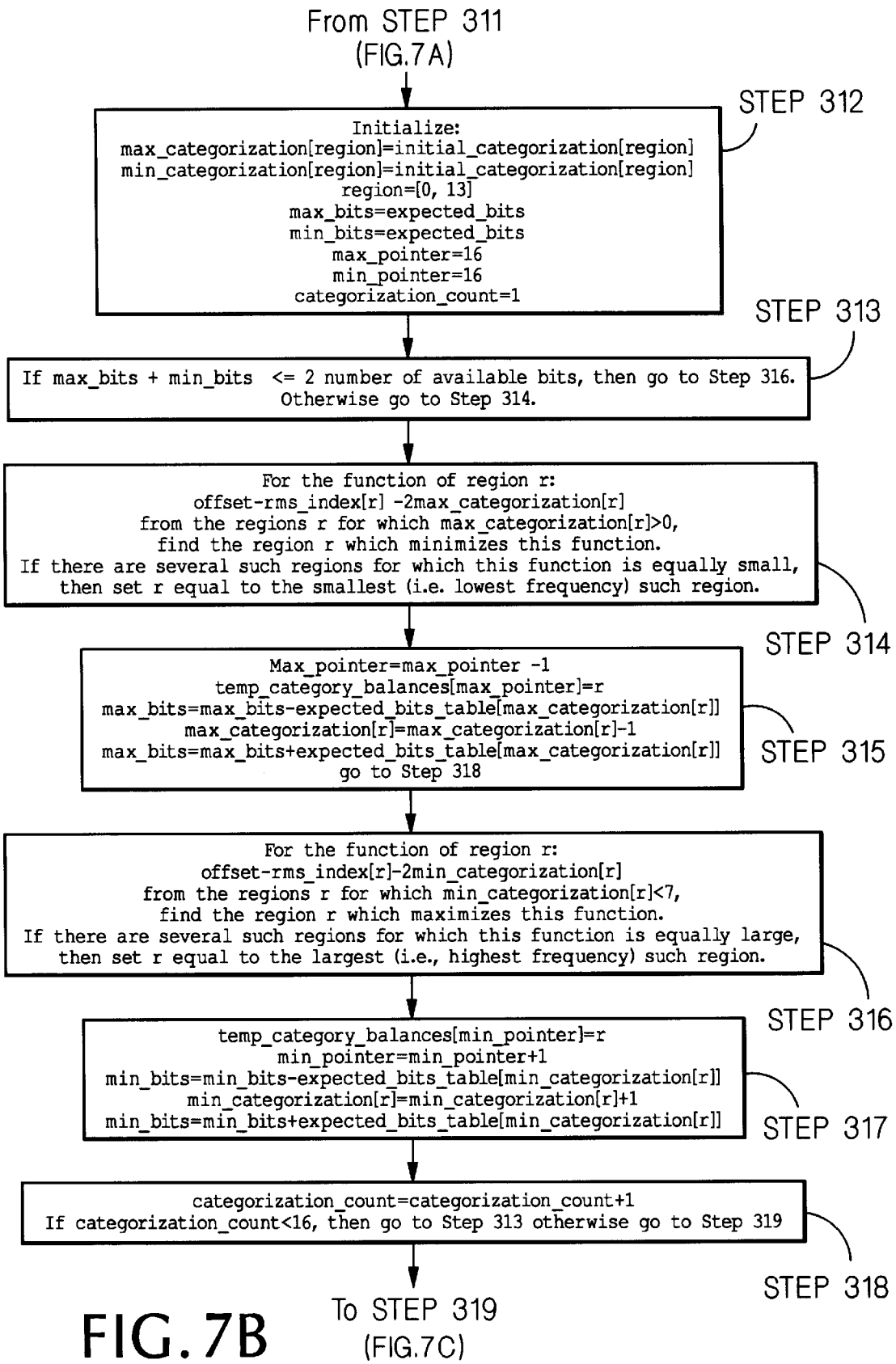

VARIABLE LENGTH CODING USING A PLURALITY OF REGION BIT ALLOCATION PATTERNS

MICROFICHE APPENDIX

A microfiche appendix containing computer source code is attached. The microfiche appendix comprises 1 sheet of microfiche having 27 frames, including one title frame. The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

This invention relates generally to audio signal encoding and decoding methods and apparatus and more particularly to encoding and decoding methods and apparatus for reducing the number of bits required to transmit digitized audio signals and enable reproduction of the audio signal at a remotely located decoder.

As is known in the art, audio signals are sometimes transmitted to a receiver by first converting the audio signals into corresponding digitized samples. Each digitized sample is made up of a number of bits, for example 8 or 16 bits. In order to reduce the reduce the number of bits transmitted, i.e., the bit rate, various encoding methods and apparatus have been suggested. The encoding method attempts to reduce the bit rate, while enabling reproduction of the audio signals at a remotely located decoder.

SUMMARY OF THE INVENTION

In accordance with one feature of the invention, an audio signal encoding method and apparatus are provided wherein overlapping groups of the digitized samples of an audio signal are converted into frames of transform coefficients. Each frame of transform coefficients is grouped into regions, or subbands. The power in each region is determined, quantized, indexed, and variable bit-length encoded. A categorization procedure determines a predetermined number categorizations using the quantized region power indices and the number of bits remaining after region power encoding. Each categorization specifies a quantization and encoding category assignment for each region, where each category defines a quantization step size, dead zone, vector dimension, and variable bit-length coding table and associated decoding tables. For each categorization, the quantization and encoding category for each region is selected in accordance with the quantized power indices in the region, the quantized power indices in all the regions, and the number of available bits. The number of bits required to transmit the encoded transform coefficients using each categorization is determined. The transform coefficients are encoded using one of the categorizations selected in accordance with a maximum bit rate criteria. The encoded quantized region power indices, an identification of the selected categorization, and the encoded transform coefficients are transmitted to a decoder.

In accordance with another feature of the invention, the quantized power in each of the regions is decoded and reconstructed from the transmitted quantized power indices. The same set of categorizations that the encoder determined are determined using the quantized power indices and the number of bits remaining after region power decoding. The selected one of the categorizations is determined from the identification thereof transmitted to the decoder by the encoder and the quantization and encoding category assignment is determined for each of the regions from the determined categorization. For each region, from the determined category for the region and the reconstructed quantized power in the region, a transform coefficient reconstruction level table, the vector dimension, and a variable bit-length decoding table are determined. The quantized transform coefficients are reconstructed for each region from the transform coefficient reconstruction level table, the vector dimension, and the variable bit-length decoding table. The transform coefficients are transformed into a time domain audio signal.

With such method and apparatus, high quality reproduction of the audio signal is achieved for a broad range of signals including music, speech and speech degraded by background noise and reverberance.

BRIEF DESCRIPTION OF THE DRAWINGS

These and other features of the invention will become more readily apparent from the following detailed description, taken together with the accompanying drawings, in which:

FIGS. 7A through 7C is a flow diagram of the categorization procedure used by the encoder of FIG. 3 and the decoder of FIG. 5.

DESCRIPTION OF THE PREFERRED EMBODIMENTS

ENCODING AND DECODING-GENERAL OVERVIEW

Figure 1:
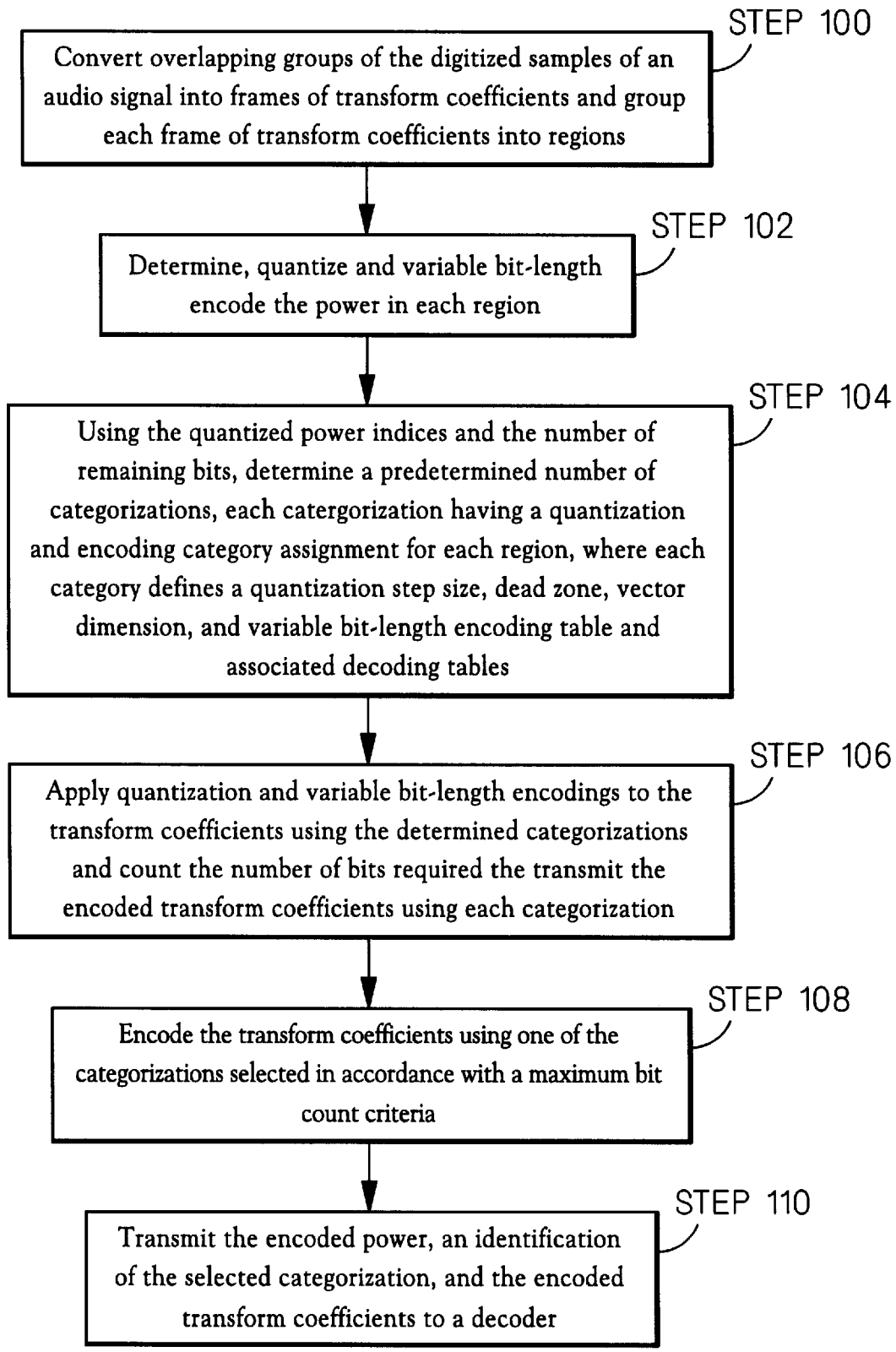
FIG. 1 is a flow diagram of a method for encoding an audio signal in accordance with the invention.

Referring now to FIG. 1, the steps used in encoding an audio signal are shown. Thus, in accordance with step 100, overlapping groups of the digitized samples of an audio signal are converted into frames of transform coefficients and each frame of transform coefficients is grouped into regions. In accordance with step 102, the power in each region is determined, quantized and variable bit-length encoded. In accordance with step 104, using the quantized power indices and the number of remaining bits, a set of categorizations is determined. Each categorization has quantization and encoding category assignment for each region. Each category defines a quantization step size, dead zone, vector dimension, variable bit-length coding table and associated decoding tables. In accordance with step 106, The quantization encoding category for each region is selected in accordance with the quantized power in the region, the quantized powers in all the regions, and the number of available bits. In accordance with step 106, quantization and variable bit-length encodings are applied to the transform coefficients using each categorization. Also, the number of bits required to transmit the encoded transform coefficients using each categorization is determined. In accordance with step 108, one of the categorizations is selected in accordance with a maximum bit count criteria and the transform coefficients are encoded accordingly. In accordance with step 110, the encoded power, an identification of the selected categorization, and the encoded transform coefficients are transmitted to a decoder.

Figure 2:
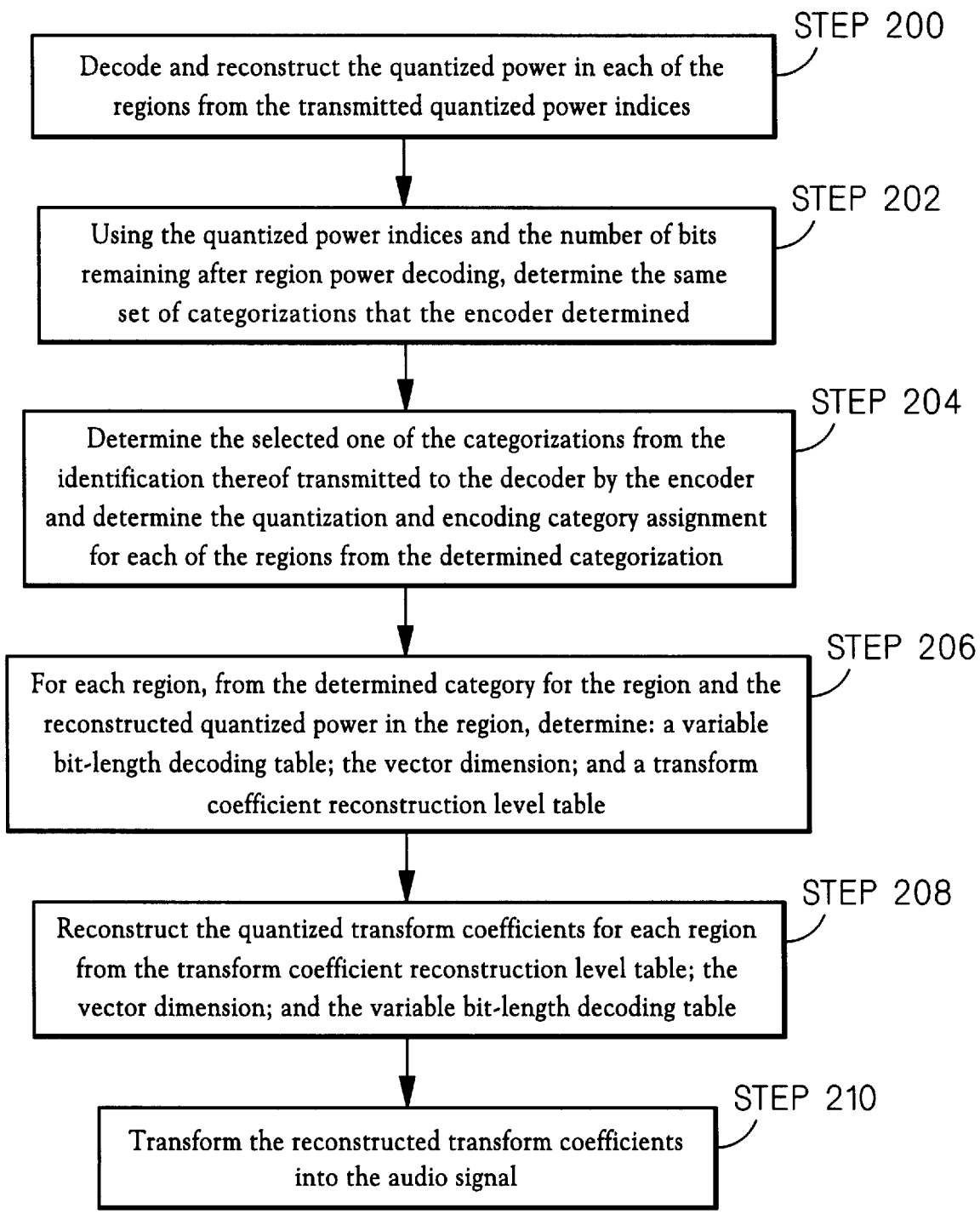
FIG. 2 is a flow diagram of a method for decoding an audio signal encoded by the method of FIG. 1 in accordance with the invention.

Referring now to FIG. 2, the steps used in decoding the encoded audio signal are shown. Thus, in step 200 the quantized power in each of the regions is decoded and reconstructed from the transmitted quantized power indices. In accordance with step 202, the same set of categorizations that the encoder determined are determined using the quantized power indices and the number of bits remaining after region power decoding. In accordance with step 204, the selected one of the categorizations is determined from the identification thereof transmitted to the decoder by the encoder and the quantization and encoding category assignment is determined for each of the regions from the determined categorization. In accordance with step 206, for each region, from the determined category for the region and the reconstructed quantized power in the region, a variable bit-length decoding table, the vector dimension, and a transform coefficient reconstruction level table are determined. In accordance with step 208, the quantized transform coefficients are reconstructed for each region from the variable bit-length decoding table, the vector dimension, and the transform coefficient reconstruction level table. In accordance with step 210, the transform coefficients are transformed into a time domain audio signal.

ENCODER 9

Figure 3:
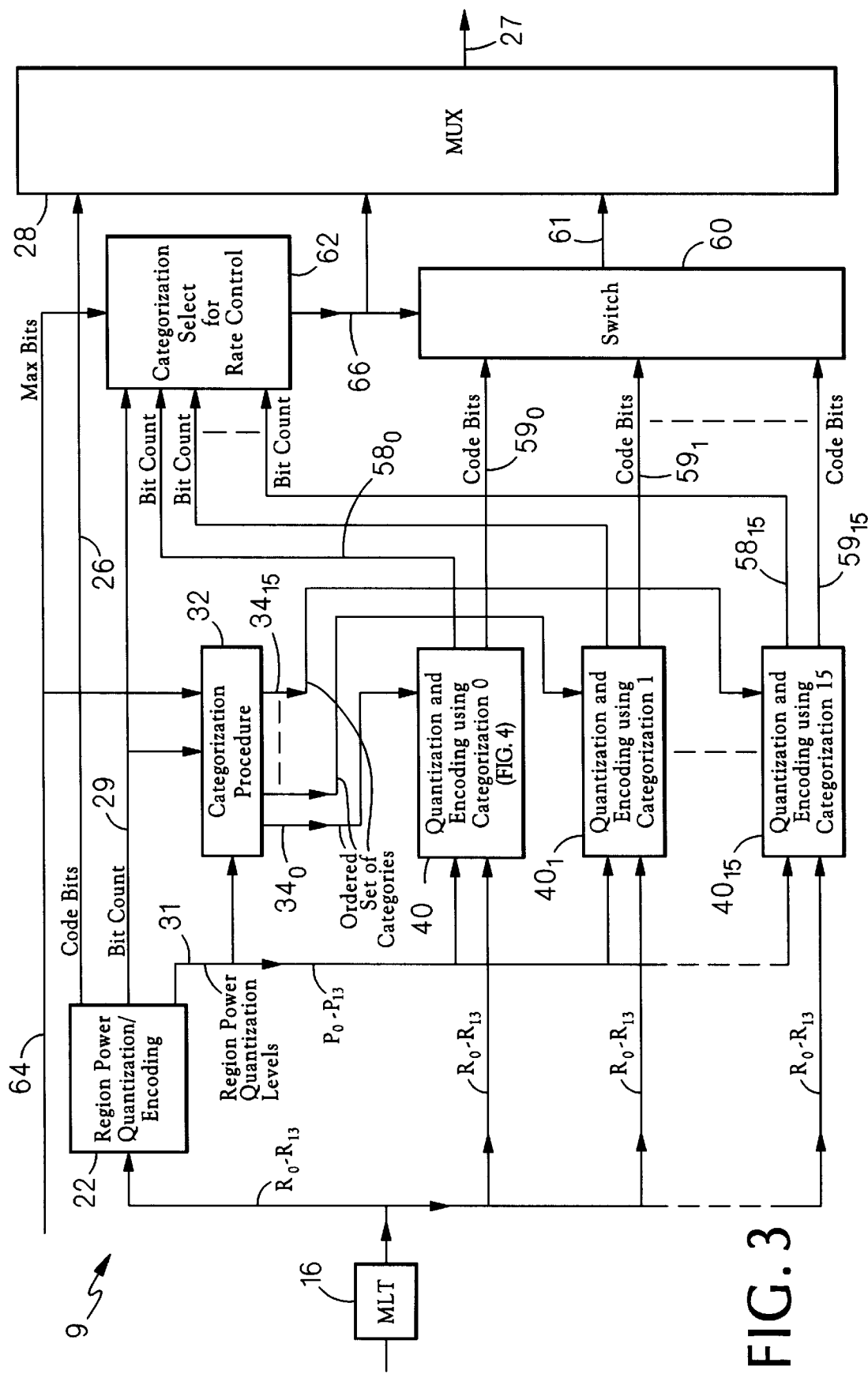
FIG. 3 is a block diagram of an encoder adapted to encode an audio signal in accordance with the invention.

More particularly, referring now to FIG. 3, an encoder 9 is shown fed by an incoming audio signal that is fed to line 10. The audio signal on line 10 is converted into digitized samples, here into a stream of 16 bit linear PCM samples at a sampling rate of 16000 samples per second, by an analog to digital (A/D) converter 14. The digitized samples are fed to a frequency spectrum analyzer, here a Modulated Lapped Transform (MLT) 16. The MLT 16 provides a projection from the time domain onto a set of orthogonal basis functions. Here, each group of 640 digitized audio signal samples are used by the MLT 16 to compute a frame of 320 MLT transform coefficients. Every 20 milliseconds (ms) the most recent 640 digitized samples are used to compute one frame of 320 transform coefficients centered at 25 Hz intervals. To put it still another way, a first group of 640 samples are fed to the MLT 16, and 20 milliseconds later a second group of 640 samples are fed to the MLT 16, it being noted that the 640 of the second group include 320 of the samples of the first group. Thus, the samples of the incoming audio signal fed to the MLT 16 are thus windowed into a series of overlapped windows, each window having digitized samples of two time-domain frames, each time-domain frame having 320 samples. It is noted that for 16000, 24000 and 32000 bit/second operation, the allotment of bits per frame is 320, 480 and 640, respectively. Further, the encoder 9 is adapted to operate with the same sample conditions as the G.722 ITU (International Telecommunications Union) audio transmission standard.

The MLT 16, as noted above performs a frequency spectrum analysis on the samples and thereby converts the 640 samples from the time domain into the into a frequency domain representation. Here, the MLT 16 transforms the 640 samples into 320 frequency components, or transform coefficients. It is noted that each frame of 640 samples is processed independently and therefore each frame of MLT transform coefficients is coded independently. Further, the MLT transform coefficients are here at 25 Hz intervals and are divided, or grouped, into here 14 regions $R_0$–$R_{13}$, each having 20 transform coefficients, respectively. Thus, each region spans 500 Hz. It is noted that here only the 14 lowest frequency regions, or 280 transform coefficients, are used.

Figure 4:
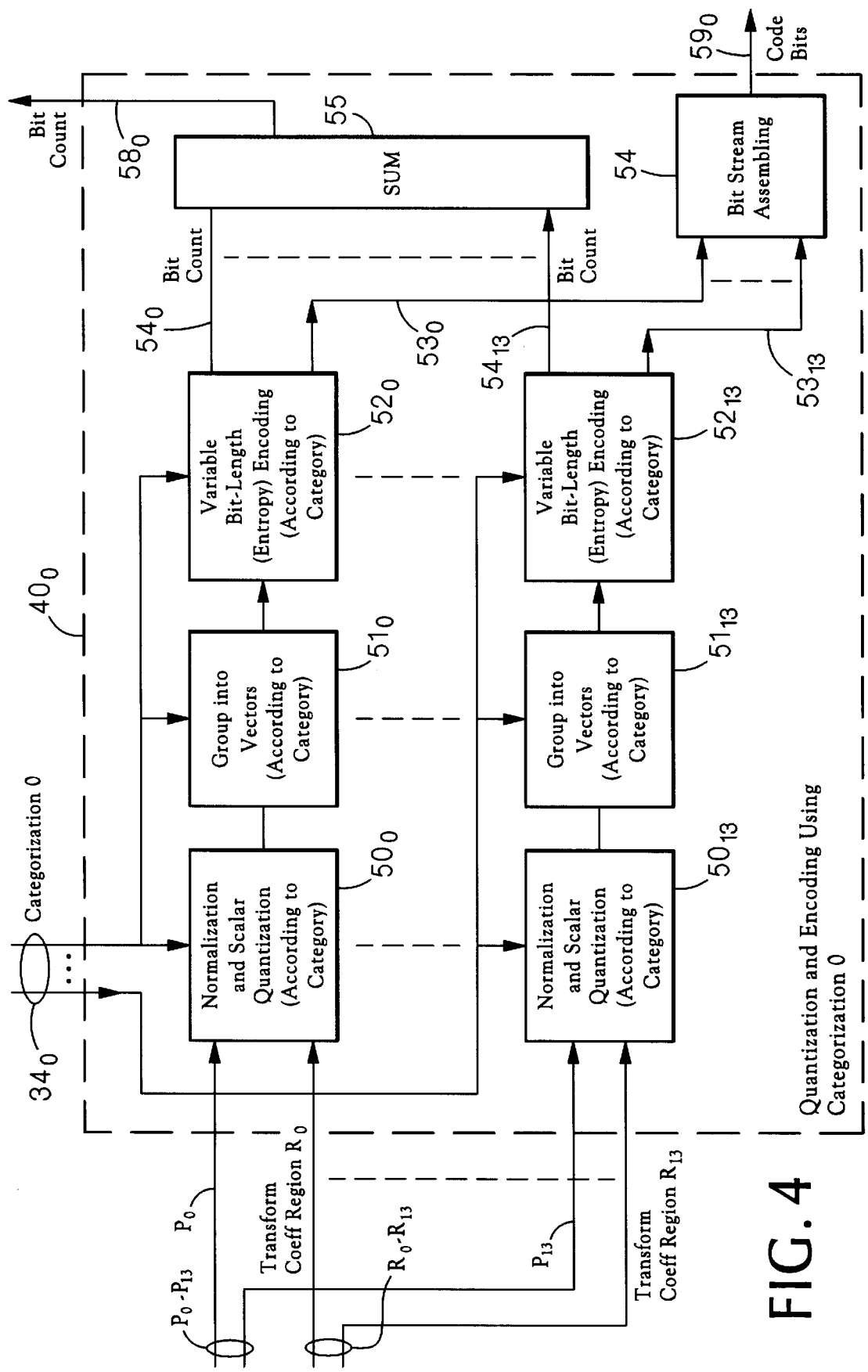
FIG. 4 is a block diagram of a MLT transform coefficient quantization and encoding module of the encoder in FIG. 3 using a representative one of predetermined number of categorizations.

Next, the spectral energy, or power, is determined for each of the regions 0–13 by region power quantization and encoding module 22. More particularly, the square root of the average power in each of the regions is computed and quantized in module 22. The lowest frequency region is coded with here 5 bits and the others are differentially coded (with respect to each other-not the previous frame). More particularly, the quantized power for each of the regions is encoded in module 22, using a variable bit-length code (i.e., entropy code), here a Huffman code. The code bits which represent the quantized power in the regions are produced by module 22 on line 26 (i.e., code bits), for transmission on transmission channel 27 via a multiplexer 28 to a decoder 30 (FIG. 4). Typically, 45 to 65 code bits are used to represent the spectral energy, or power (i.e., amplitude) envelope of the power over the regions. Thus, the quantized spectral energy, or power, for each region is transmitted in an encoded format to a transmission channel 27. The region power quantization and encoding module 22 also produces the corresponding bit count on line 29. Module 22 also produces the corresponding power quantization level indices $P_0$–$P_{13}$ for each of the fourteen regions on line 31. These indices $P_0$–$P_{13}$ are referred to herein as rms_index[r], where r is the region index from 0 to 13. In this illustrated embodiment, each MLT transform coefficient in a region is first normalized by the corresponding square root of the quantized average power for the region, and then scalar quantized. (This is operationally equivalent to quantizing the un-normalized MLT transform coefficients with a step size that is the product of the region's quantized root mean square (rms) power and the step size associated with a selected quantization category (i.e., here eight categories, category 0 through category 7) for the region, to be described). It is noted here, however, that a separate quantization category, or quantization step size, (i.e, category 0 through category 7) is assigned to each of regions 0–13, the collection of categories for each region defining one of a predetermined number of, here 16, categorizations (i.e., categorization 0–Categorization 15). As noted above, there are 8 quantization categories; i.e., category 0 through category 7. Category 0 has the smallest quantizer step size and uses the most bits. Category 7 has only one quantization output value, set to "0". For each category, there are the following quantization parameters: quantization step size (i.e., stepsize), dead zone expansion parameter (i.e., deadzone_rounding), maximum scalar quantization index (i.e., kmax), decoder reconstruction levels, vector dimension for combining scalar quantization indices (i.e., vd), and a variable bit-length code for each vector (i.e., u). For each category there also is an expected bit consumption. Thus, for a categorization, one of the eight quantization categories is assigned to each region and then each of the normalized MLT transform coefficients in the region is scalar quantized using the step size (i.e., stepsize) that corresponds to that category. The resulting quantization indices are combined into vectors and the resulting vectors are Huffman coded.

To put it another way, the quantization category is determined using the spectral energies, or powers, determined above for all the regions. For each categorization, the transform coefficients are quantized based on the quantization step sizes associated with the quantization category assigned to each region by the categorization. That is, each of the normalized MLT transform coefficients in a region is scalar quantized using the step size that corresponds to that category for that region. The resulting quantization indices are combined into vectors and the resulting vectors are encoded, here using a Huffman code, and the total number of bits required to transmit the quantized information, in accordance with that categorization encoding method, is determined.

Since this process produces an a priori unknown number of bits, it may be necessary to adjust the category assignment for some regions so that the total number of bits in the frame comes close as possible to meeting, but does not exceed the allotment. Therefore, a plurality of perturbed category assignments (i.e., categorizations), here 16, is determined for the regions based upon a predetermined set of rules, to be described. For each categorization, the total number of bits required to transmit said quantized information in accordance with quantization step sizes resulting from the perturbed category assignments is determined. Based upon a fidelity criteria (i.e., smallest possible quantization step sizes) and a maximum channel bit rate, one of the categorizations and its quantization step sizes is selected for transmission through the channel 37. The transform coefficients are quantized in accordance with the selected quantization steps by modules $40_0$–$40_{15}$.

More particularly, for each frame 4 bits are used to select one of the 16 possible categorizations. Here, a categorization specifies a category assignment for each of the 14 regions. In the illustrated embodiment, the categorizations are indexed inversely in terms of total expected bit consumption. Categorizations are determined by a preset rule, or principles, to be described, and index order neighbors will differ only in one region and in that region the category indices will differ by only 1.

The quantized transform coefficient indices are grouped together into vectors and then encoded for transmission to the channel 27 in the selected one of the quantization and encoding modules $40_0$–$40_{15}$. Then the resulting code bits are applied to multiplexer 28 along with the quantized powers on line 26 and an identification of the selected categorization on line 66. The decoder 30 (FIG. 5) can reconstruct an audio signal from the information received over the channel 27.

A categorization procedure module 32 is provided. A categorization consists of one category assignment for each of the 14 regions. The categorization procedure module 32 computes 16 possible categorizations for the regions according to a predetermined rule, or principles described below.

The first principle is that if the power in a region A is 2X db greater than the power in a region B, then the quantization step-size applied to unnormalized MLT transform coefficients in region A should be greater by X dB than the step size applied to unnormalized MLT transform coefficients in region B. Equivalently, the quantization step-size for the normalized MLT transform coefficients in region A should be X db smaller than the quantization step-size for the normalized MLT transform coefficients in region B. In this categorization procedure 32, if region A comprises lower spectral frequencies than region B, then for some categorizations its quantizer step size may be X+3 db smaller than region A's.

The second principle is that the ratio of signal power in a region to quantization noise in that region should not exceed some threshold beyond which the quantization noise is fully perceptually masked by the signal power. This principle is implicit in the fact that the smallest step size (0.3536 for category 0) is not very small.

Thus, the categorization module 32 produced 16 categorizations (Categorization 0 through Categorization 15) on lines $34_0$–$34_{15}$, respectively, as indicated.

The categorizations (Categorization 0 through Categorization 15) are fed to quantization and encoding modules $40_0$–$40_{15}$. An exemplary one of the modules, here module $40_0$ is shown in FIG. 4. The module $40_0$ in response to: the categorization, here Categorization 0 (i.e, the category assignment for each region); the MLT transform coefficients in the regions $R_0$–$R_{13}$; and the set of region power quantization levels, $P_0$–$P_{13}$, performs a sequence of operations. This sequence is: combined normalization and quantization of the MLT coefficients (module $50_0$–$50_{13}$), grouping of the scalar quantization indices into vector indices (module $51_0$–$51_{13}$), and variable bit-length encoding of the vector indices (module $52_0$–$52_{13}$). For each region, each of these three operations is performed in accordance with the category assignment for that region, here determined by Categorization 0. Code bits which represent the quantized MLT transform coefficients are produced by module 52 on lines $53_0$–$53_{13}$ (i.e., code bits). The code bits on lines $53_0$–$53_{13}$ are fed to a bit stream assembling module 54 which orders, or arranges the variable bit-length codes on line $59_0$ for a switch 60 (FIG. 3). Modules $40_1$–$40_{15}$ operate in a similar manner to produce code bits on lines $59_1$–$59_{15}$.

The modules $52_0$–$52_{13}$ each also produce the corresponding bit count on lines $54_0$–$54_{13}$. These bit counts are summed in module 55 which produces a total MLT coefficient coding bit count for Categorization 0 on line $58_0$. Modules $40_1$–$40_{15}$ operate in a similar manner to total bit counts for Categorizations 1 through 15 on line $58_1$–$58_{15}$, respectively. Module 62 determines the number of bits available for MLT transform coefficient transmission. This module 62 starts with the predetermined number of bits per frame on line 64 (here 320 bits per frame for 16000 bits per second operation) and subtracts from it the region power bit count on line 29. The result is reduced by a bit count of four, which is the number of bits which will be used to the categorization selection. The result is the number of bits available for MLT transform coefficient transmission. Module 62 examines the bit counts on lines $58_0$–$58_{15}$. The module 62 then identifies categorizations with bit counts not in excess of the number of available bits for MLT coefficient transmission. From the identified categorization, module 62 selects the categorization with the lowest indexed categorization, e.g. it prefers Categorization N to Categorization N+1. Module 62 provides the four bit representation of this categorization index N, on line 66 for switch 60 and multiplexer 28.

Switch 60 couples selected MLT transform coefficients code bits on one of the lines $59_0$–$59_{15}$ to multiplexer 28 via line 61. The multiplexer 28 couples the bits on lines 26, 66, and 66, sequentially to channel 27. Multiplexer produces fill-bits as needed to fill up the frame.

THE MODULATED LAPPED TRANSFORM (MLT) 16

The Modulated Lapped Transform or MLT 16 is a critically sampled, perfect reconstruction linear transform with basis functions that overlap between frames.

The inputs to each MLT are the newest 640 time domain samples, x[n], n=[0,639], where x[0] is the oldest sample.

The outputs are 320 transform domain values mlt[m], m=[0,319].

mlt[m]=SUM n=[0,639]sqrt(2/320)* sin((n+0.5)*PI/640)* cos((n−159.5)*(m+0.5)*PI/320)*x[n]

This can be decomposed into a window, overlap and add operation followed by a type IV Discrete Cosine Transform (DCT).

WINDOWING

The window, overlap and add operation is:

v[n]=w[n]*x[n]+w[319−n]*x[319−n], n=[0,159]

v[n+160]=w[319−n]*x[320+n]−w[n]*x[639−n], n=[0, 159]

where w[n]=sin((n+0.5)*PI/640), n=[0,319]

The type IV DCT is:

mlt[m]=SUM n=[0,319]sqrt(2/320)* cos((n+0.5)*(m+0.5)*PI/320)*v[n]

(It should be noted that a fast transform techniques may be used to reduce the computation time required for the DCT.)

POWER AMPLITUDE ENVELOPE COMPUTATION AND ENCODING (Module 22)

As noted above, the MLT transform coefficients are divided into 14 regions of 20 transform coefficients. Region r includes MLT transform coefficients 20r through 20r+19, where r ranges from 0 to 13. The 40 highest frequency MLT transform coefficients represent frequencies above 7000 hz. These are discarded. The square root of the mean power in each region is determined, as follows:

rms[r]=square root of ((SUM [n=0,19] mlt[20*r+n]*mlt[20*r+n])/20.0)

A quantization index rms_index[r] is then determined for each region r. The possible quantization values are the set 2^((i+2)/2), where i is an integer in the range [−8,31]. The rms_index[0] is further constrained to the range [1–31]. A log domain metric is used so that the values which get quantized to 2^(i/2) range from 2^((i−0.5)/2) to 2^((i+0.5)/2).

The rms_index[0] is the first data transmitted for each frame. The most significant bit (msb) of this index is transmitted first. The value of 0 for rms_index[0] is reserved as an escape code. The other 13 indices are differentially coded and then Huffman coded for transmission. The largest differences which can be coded are +11 and −12. When necessary, valleys are adjusted upwards to allow the peaks which follow them to be accurately represented, as follows:

for (r=12; r>=0; r−−) {if (rms_index[r]<rms_index[r+1]−11) rms_index[r]=rms_index[r+1]−11;} for (r=1; r<14; r++) {j=rms_index[r]−rms_index[r−1];if (j<−12) {j=−12;

rms_index[r]=rms_index[r−1]+j;} differential_rms_index[r]=j;}

The differences, are transmitted in order of region. They are coded in accordance with the variable bit-length codes defined below.

The leftmost bit is transmitted first.

```
int differential_region_power_bits[14][24] = {

{99,99,99,99,99,99,99,99,99,99,99,99,99,99,99,99,99,99,99,99,99,99,99,99},
{ 4, 6, 5, 5, 4, 4, 4, 4, 4, 4, 3, 3, 3, 4, 5, 7, 8, 9,11,11,12,12,12,12},
{10, 8, 6, 5, 5, 4, 3, 3, 3, 3, 3, 3, 4, 5, 7, 9,11,12,13,15,15,15,16,16},
{12,10, 8, 6, 5, 4, 4, 4, 4, 4, 3, 3, 3, 4, 4, 5, 5, 7, 9,11,13,14,14,14},
{13,10, 9, 9, 7, 7, 5, 5, 4, 3, 3, 3, 3, 3, 4, 4, 4, 5, 7, 9,11,13,13,13},
{12,13,10, 8, 6, 6, 5, 5, 4, 4, 3, 3, 3, 3, 3, 4, 5, 5, 6, 7, 9,11,14,14},
{12,11, 9, 8, 8, 7, 5, 4, 4, 3, 3, 3, 3, 3, 4, 4, 5, 5, 7, 8,10,13,14,14},
{15,16,15,12,10, 8, 6, 5, 4, 3, 3, 3, 2, 3, 4, 5, 5, 7, 9,11,13,16,16,16},
{14,14,11,10, 9, 7, 7, 5, 5, 4, 3, 3, 2, 3, 3, 4, 5, 7, 9, 9,12,14,15,15},
{ 9, 9, 9, 8, 7, 6, 5, 4, 3, 3, 3, 3, 3, 4, 5, 6, 7, 8,10,11,12,13,13},
{14,12,10, 8, 6, 6, 5, 4, 3, 3, 3, 3, 3, 3, 4, 5, 6, 8, 8, 9,11,14,14,14},
{13,10, 9, 8, 6, 6, 5, 4, 4, 4, 3, 3, 2, 3, 4, 5, 6, 8, 9, 9,11,12,14,14},
{16,13,12,11, 9, 6, 5, 5, 4, 4, 4, 3, 2, 3, 3, 4, 5, 7, 8,10,14,16,16,16},
{13,14,14,14,10, 8, 7, 7, 5, 4, 3, 3, 2, 3, 3, 4, 5, 5, 7, 9,11,14,14,14}},
int differential_region_power_codes[14][24] = {

{ 0, 0, 0, 0, 0, 0, 0, 0, 0, 0, 0, 0, 0, 0, 0, 0, 0, 0, 0, 0, 0, 0, 0, 0},
{ 8,38,18,10, 7, 6, 3, 2, 0, 1, 7, 6, 5, 4,11,78,158,318,1278,1279,2552,2553,2554,2555},
{36, 8, 3, 5, 0, 1, 7, 6, 4, 3, 2, 5, 3, 4, 5,19,74,150,302,1213,1214,1215,2424,2425},
{2582,644,160,41, 5,11, 7, 5, 4, 1, 0, 6, 4, 7, 3, 6, 4,21,81,323,1290,5167,10332,10333},
{2940,366,181,180,47,46,27,10, 8, 5, 1, 0, 3, 7, 4, 9,12,26,44,182,734,2941,2942,2943},
{3982,7967,994,249,63,26,19,18,14, 8, 6, 1, 0, 2, 5, 7,12,30,27,125,496,1990,15932,15933},
{3254,1626,407,206,202,100,30,14, 3, 5, 3, 0, 2, 4, 2,13,24,31,102,207,812,6511,13020,13021},
{1110,2216,1111,139,35, 9, 3,20,11, 4, 2, 1, 3, 3, 1, 0,21, 5,16,68,276,2217,2218,2219},
{1013,1014,127,62,29, 6, 4,16, 0, 1, 3, 2, 3, 1, 5, 9,17, 5,28,30,252,1015,2024,2025},
{381,380,372,191,94,44,16,10, 7, 3, 1, 0, 2, 6, 9,17,45,92,187,746,1494,2991,5980,5981},
{3036,758,188,45,43,10, 4, 3, 6, 4, 2, 0, 3, 7,11,20,42,44,46,95,378,3037,3038,3039},
{751,92,45,20,26, 4,12, 7, 4, 0, 4, 1, 3, 5, 5, 3,27,21,44,47,186,374,1500,1501},
{45572,5697,2849,1425,357,45,23, 6,10, 7, 2, 2, 3, 0, 4, 6,
7,88,179,713,11392,45573,45574,45575},
{2511,5016,5018,5017,312,79,38,36,30,14, 6, 0, 2, 1, 3, 5, 8,31,37,157,626,5019,5020,5021}};
```

The quantized indices for the quantized and encoded power amplitude envelope are fed to line 46.

CATEGORIZATION PROCEDURE (Module 32)

A categorization consists of one assignment for each of the 14 regions. That is, for each of the 14 regions, a categorization assigns one of the eight categories. The categorization procedure module 32 computes 16 possible categorizations for the regions according to preset rules, or principles. More particularly, the categorization procedure determines quantizer step-sizes or associated categories in accordance with the following two principles:

1. The first principle is that if the power in a region A is 2X db greater than the power in a region B, then the quantization step-size applied to unnormalized MLT transform coefficients in region A should be greater by X dB than the step size applied to unnormalized MLT transform coefficients in region B. Equivalently, the quantization step-size for the normalized MLT transform coefficients in region A should be X db smaller than the quantization step-size for the normalized MLT transform coefficients in region B. (In this coder, if region A comprises lower spectral frequencies than region B, then for some categorizations its quantizer step size may be X+3 db smaller than region A's.)
2. The second principle is that the ratio of signal power in a region to quantization noise in that region should not exceed some threshold beyond which the quantization noise is fully perceptually masked by the signal power. This principle is implicit in the fact that the smallest step size (0.3536 for category 0) is not very small.

It is vital for interoperability that given the same inputs different implementations of this procedure produce identical categorizations. The inputs to this procedure are:

number_of available bits=the number of bits remaining after power amplitude envelope coding and rate control (i.e., categorization)

rms_index[]=the array of 14 integers which specify the region power quantization levels in 3.01 db steps.

The category assigned to a region determines the quantization and coding parameters for that region and also an expected total number of bits for representing the quantized MLT levels in the region. Because a statistically-based variable bit-length coding method is used, here the Huffman code, the actual number of bits will vary depending on the MLT transform coefficients in the region. That is why it is necessary to compute multiple possible categorizations.

It is noted that in this illustrated embodiment, there are 8 quantization categories. The expected bit totals are given in an expected_bits_table, as follows:

| category | expected_bits_table expected number of code bits per region) |
|---|---|
| 0 | 52 |
| 1 | 47 |
| 2 | 43 |
| 3 | 37 |
| 4 | 29 |
| 5 | 22 |
| 6 | 16 |
| 7 | 0 |

The procedure first computes raw_category[region]=−rms_index[region] for each region. For any integer offset in [−64,63] the equation j[region]=Max{0,MIN{7,(raw_category[region]+offset)/2}} assigns categories to regions in accordance with perceptual masking principles. The total expected number of MLT code bits is expected_number_of_code_bits=SUM region=[0,13] expected_bits_table[j[region]]

The value of offset is then adjusted until the smallest offset is found such that expected_number_of_code_bits<number_of_available_bits. (A binary search can be used for this purpose.) The initial_power_categories [region] is then set to Max{0,MIN{7,(raw-category [region]+offset)/2}}.

Once this categorization is found, 15 other categorizations are derived by adjusting the category in one region per categorization. First max_rate_categories[region] and min_rate_categories[region] to initial_power_categories [region] are initialized. Also initialized are:

max_bits and min_bits=expected_number_of_code_bits max_rate_categories[region]=initial_power_categories[region], region=[0,13]

min_rate_categories[region]=initial_power_categories[region], region =[0,13]

max_bits=expected_number_of_code_bits min_bits=expected_number_of_code_bits

Then 15 times max_bits+min_bits is compared to 2*number_of_available_bits. If max_bits+min_bits<= 2*number_of_available_bits then a new categorization with a larger expected number of bits is needed. Otherwise a categorization with a smaller expected number of bits is needed.

If a categorization with a larger expected number of bits is needed, the lowest frequency region for which the category is not already 0 and raw_category[region]+offset−2*max_rate_categories[region] is at least as small as for any other region is found. The category for this region is reduced by one in max_rate_categories[]. Then the expected number of bits for this new categorization is computed and max_bits is set equal to it.

If a categorization with a smaller expected number of bits is needed, the highest frequency region for which the category is not already category 7 and raw_category [region]+offset−2*max_rate_categories[region] is at least as large as for any other region is found. The category for this region is increased by one in min_rate_categories[]. Then the expected number of bits for this new categorization is computed and min_bits is set equal to it.

In this way produce 16 categorizations are produced that can be ordered in terms of expected number of bits are produced. Categorization 0 has the largest expected number of bits and Categorization 15 the smallest. Each categorization is the same as its neighbors in the ordering except in a single region where the categories differ by one.

It should be noted that the categorization procedure described above, may be modified to include a third principle. The third principle for the categorization procedure is that signal power in one region can mask quantization noise in another region and that this masking effect is greatest when the regions are spectrally near. Using only the first two principles the category assignment for a region is not influenced by the spectral nearness of the power in other regions. Adding the third principle makes spectral distance matter. It would change the equation above raw_category [region]=−rms_index[region] to:

2^rms_index[region] raw_category[region]=−log of
 SUM r=[0,13] (weight[region,r]*2^rms_index[r]);
where weight[region,r] is some fixed function that declines as spectral distance (|region−r|) increases. Notice that if weight[region,r] were a constant then this expression would reduce to raw_category[region]=−rms_index[region]+ some constant.]

Figure 7C:
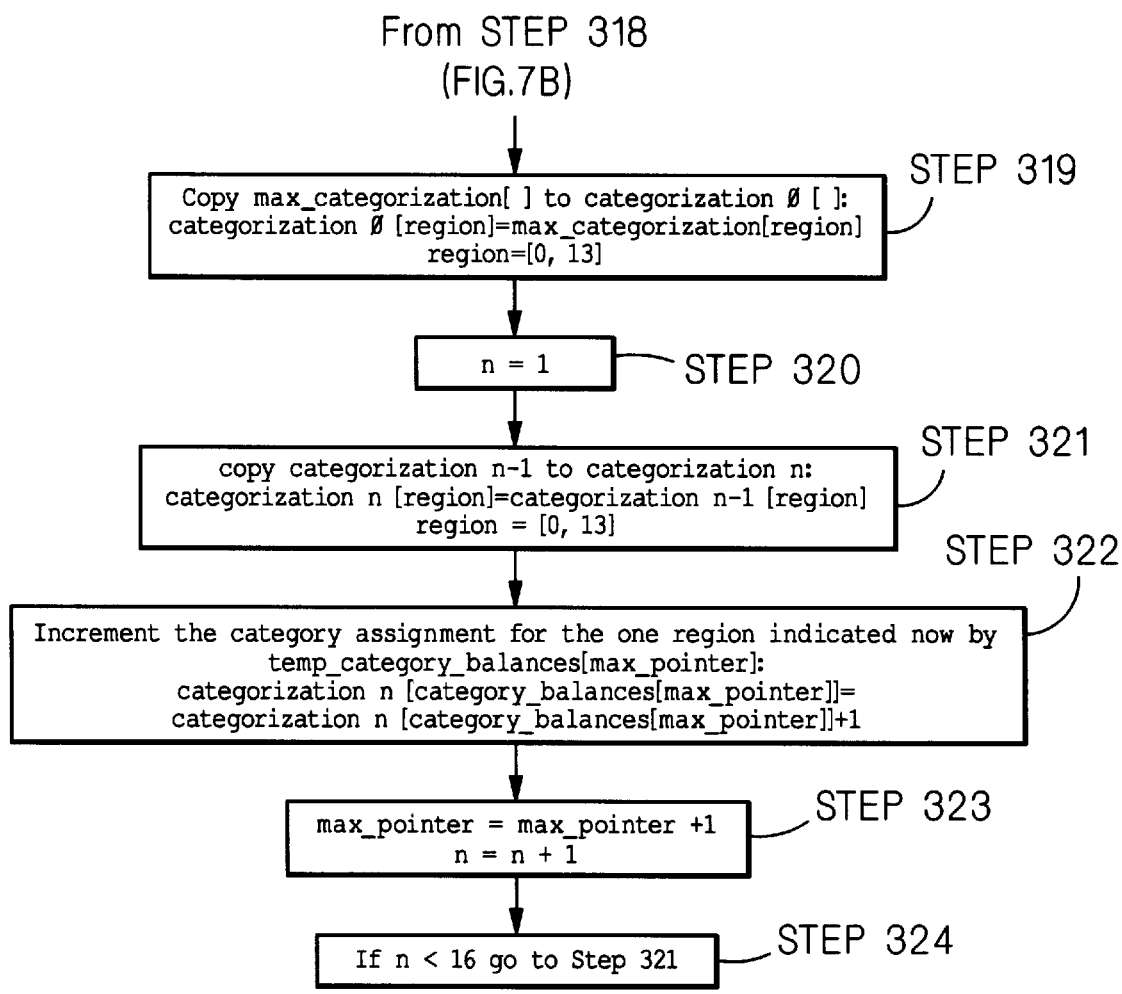

FIGS. 7A–7C are a flow diagram showing steps 300–324 used in the categorization procedure in accordance with the first two principles.

SCALAR QUANTIZED VECTOR HUFFMAN CODING (SQVH) (Module 40₀–40₁₅)

MLT transform coefficients in categories 0 through 6 are normalized, quantized, combined into vectors, and then Huffman coded. The MLT transform coefficients are first normalized and scalar quantized with dead zone expansion. The resulting quantization indices are then combined into vector indices. Finally, the vector indices are variable bit-length encoded.

For regions assigned to category 7, no bits are transmitted.

For regions for which the category is not category 7, the encoder normalizes and quantizes in modules $42_0$–$42_{13}$ and 44 the absolute value of each MLT transform coefficient, mlt[i], to produce quantization index k[i]:

k[i]=max{whole number part of (x*absolute value of mlt[20*region+i]+deadzone_rounding), kmax};

where x=1.0/(stepsize*(quantized rms value for the region)) and stepsize, deadzone_rounding, and kmax are given in the following TABLE:

TABLE

| category | stepsize | deadzone_rounding | kmax |
|---|---|---|---|
| 0 | 2.0^−1.5 | 0.3 | 13 |
| 1 | 2.0^−1.0 | 0.33 | 9 |
| 2 | 2.0^−0.5 | 0.36 | 6 |
| 3 | 2.0^0.0 | 0.39 | 4 |

TABLE-continued

| category | stepsize | deadzone_rounding | kmax |
|---|---|---|---|
| 4 | 2.0^0.5 | 0.42 | 3 |
| 5 | 2.0^1.0 | 0.45 | 2 |
| 6 | 2.0^1.5 | 0.5 | 1 |

These indices are combined into vector indices. The properties of the vectors are given in the following table:

vd := vector dimension
vpr := number of vectors per region
u := (kmax+1)^vd which is the number of distinct vectors

| category | vd | vpr | u |
|---|---|---|---|
| 0 | 2 | 10 | 196 |
| 1 | 2 | 10 | 100 |
| 2 | 2 | 10 | 49 |
| 3 | 4 | 5 | 625 |
| 4 | 4 | 5 | 256 |
| 5 | 5 | 4 | 243 |
| 6 | 5 | 4 | 32 |

In general, index[n] is calculated according to the following:

vector index[n]=SUM over i=[0,vd−1] (k[(n*vpr)+i]* (kmax+1)^(vd−(i+1)))

The number of bits required to represent a vector with index vector_index for category x is in the mlt_sqvh_bitcount_category_x table, below. The corresponding code bits are in the mlt_sqvh_code_category_x table, below. These numbers are then summed together with the numbers sign bits to determine the total number of bits required to represent this region with this category:

number_of_region_bits[region]=SUM n=[0,vpr−1] mlt_vector_quant_bits[category] [vector_index[n]].

The mit_sqvh_bitcount_category_x and mlt_sqvh_code_category_x tables are below:

```
int mlt_sqvh_bitcount_category_0[196] = {
1, 4, 6, 6, 7, 7, 8, 8, 8, 9, 9,10,11,11, 4, 5,
6, 7, 7, 8, 8, 9, 9, 9, 9,10,11,11, 5, 6, 7, 8,
8, 9, 9, 9, 9,10,10,10,11,12, 6, 7, 8, 9, 9, 9,
9,10,10,10,10,11,12,13, 7, 7, 8, 9, 9, 9,10,10,
10,10,11,11,12,13, 8, 8, 9, 9, 9,10,10,10,10,11,
11,12,13,14, 8, 8, 9, 9,10,10,11,11,11,12,12,13,
13,15, 8, 8, 9, 9,10,10,11,11,11,12,12,13,14,15,
9, 9, 9,10,10,10,11,11,12,13,12,14,15,16, 9, 9,
10,10,10,10,11,12,12,14,14,16,16,16, 9, 9,10,10,
11,11,12,13,13,14,14,15,15,16,10,10,10,11,11,12,
12,13,15,15,16,14,15,15,11,11,11,12,13,13,13,15,
16,16,16,16,14,15,11,11,12,12,13,13,14,15,16,16,
16,16,16,14};
```

```
int mit_sqvh_code_category_0[196] = {
```

| 1, | 2, | 1, | 24, | 14, | 51, | 9, | 68, | 110, | 26, | 218, | 54, | 154, | 761, | 3, | 10, |
|---|---|---|---|---|---|---|---|---|---|---|---|---|---|---|---|
| 22, | 8, | 58, | 22, | 71, | 16, | 30, | 50, | 213, | 75, | 94, | 632, | 15, | 18, | 52, | 23, |
| 107, | 5, | 54, | 63, | 239, | 46, | 276, | 271, | 851, | 252, | 28, | 10, | 12, | 1, | 22, | 133, |
| 191, | 55, | 105, | 278, | 317, | 554, | 310, | 276, | 32, | 50, | 94, | 20, | 187, | 219, | 13, | 268, |
| 473, | 445, | 145, | 849, | 1277, | 623, | 1, | 14, | 0, | 55, | 238, | 121, | 120, | 269, | 318, | 530, |
| 639, | 1117, | 509, | 556, | 24, | 78, | 51, | 153, | 62, | 308, | 16, | 25, | 68, | 1058, | 428, | 277, |
| 2233, | 1114, | 92, | 108, | 141, | 223, | 270, | 381, | 24, | 212, | 760, | 35, | 1063, | 279, | 1717, | 3439, |
| 7, | 21, | 152, | 73, | 309, | 310, | 95, | 944, | 1890, | 2232, | 1891, | 5107, | 10213, | 4981, | 61, | 62, |
| 9, | 79, | 474, | 475, | 848, | 1059, | 1056, | 1716, | 139, | 4978, | 4983, | 4983, | 140, | 186, | 76, | 444, |
| 144, | 633, | 1057, | 838, | 2237, | 4472, | 4473, | 10212, | 10212, | 4983, | 74, | 78, | 311, | 213, | 850, | 1062, |
| 1119, | 508, | 276, | 277, | 4982, | 4473, | 10212, | 10212, | 208, | 70, | 555, | 418, | 68, | 510, | 2552, | 1115, |

```
4980, 4979, 4982,  4982, 4473, 10212,   215,    71,   253,   511,   839,  1718,  2488,  6876,  6877, 4979,
4979, 4982, 4982,  4473};
``` int nit_sqvh_bitcount_category_1[100] = {

```
1, 4, 5, 6, 7, 8, 8, 9,10,10, 4, 5, 6, 7, 7, 8,
8, 9, 9,11, 5, 5, 6, 7, 8, 8, 9, 9,10,11, 6, 6,
7, 8, 8, 9, 9,10,11,12, 7, 7, 8, 8, 9, 9,10,11,
11,13, 8, 8, 8, 9, 9,10,10,11,12,14, 8, 8, 8, 9,
10,11,11,12,13,15, 9, 9, 9,10,11,12,12,14,14,14,
9, 9, 9,10,11,12,14,16,14,14,10,10,11,12,13,14,
16,16,16,14};
``` int mlt_sqvh_code_category_1[100] = {

```
    1,     2,    11,    27,    31,     9,   120,    31,   275,   310,     1,     0,    12,     5,    33,    54,
  102,   111,   246,   448,    10,    14,    31,    39,    59,   100,   114,   202,   485,   969,    24,    26,
   36,    52,   103,    30,   120,   242,    69,  1244,    35,    32,    14,    61,   113,   117,   233,   486,
  487,  2491,    13,    12,    69,   110,   149,    35,   495,   449,  1978,  7751,    76,    75,   122,   136,
  213,    68,   623,   930,  3959,  9961,   115,    16,   107,   225,   424,   850,  1936,  7916,  4981,  4981,
  148,   154,   243,   407,   988,   851,  7750, 19920,  7916,  4981,   406,   274,   464,   931,  3874,  7917,
19921, 19920, 19920,  7916};
``` int mlt_sqvh_bitcount_category_2[49] = {

```
1, 4, 5, 7, 8, 9,10, 3, 4, 5, 7, 8, 9,10, 5, 5,
6, 7, 8,10,10, 7, 6, 7, 8, 9,10,12, 8, 8, 8, 9,
10,12,14, 8, 9, 9,10,11,15,16, 9,10,11,12,13,16,
15},
``` int mlt_sqvh_code_category_2[49] = {

```
    1,     0,    10,    11,    28,    62,   363,     3,     2,     9,     8,    24,    53,   352,     7,     8,
   13,    25,    89,    74,   355,    10,    23,    24,    29,    55,   354,  1449,    25,    19,    30,    52,
  108,   438,  5793,    91,    36,    63,   353,   725, 11584, 23170,   180,    75,   218,   439,  2897, 23171,
11584},
``` int mlt_sqvh_bitcount_category_3[625] = {

```
2, 4, 6, 8,10, 5, 5, 6, 8,10, 7, 8, 8,10,12, 9,
9,10,12,15,10,11,13,16,16, 5, 6, 8,10,11, 5, 6,
8,10,12, 7, 7, 8,10,13, 9, 9,10,12,15,12,11,13,
16,16, 7, 9,10,12,15, 7, 8,10,12,13, 9, 9,11,13,
16,11,11,12,14,16,12,12,14,16,14, 9,11,12,16,16,
9,10,13,15,16,10,11,12,16,16,13,13,16,16,16,16,
16,15,16,16,11,13,16,16,15,11,13,15,16,16,13,13,
16,16,16,14,16,16,16,16,16,16,16,16, 4, 6, 8,
10,13, 6, 6, 8,10,13, 9, 8,10,12,16,10,10,11,15,
16,13,12,14,16,16, 5, 6, 8,11,13, 6, 6, 8,10,13,
8, 8, 9, 11,14,10,10,12,12,16,13,12,13,15,16, 7
8, 9,12,16, 7, 8,10,12,14, 9, 9,10,13,16,11,10,
12,15,16,13,13,16,16,15, 9,11,13,16,16, 9,10,12,
15,16,10,11,13,16,16,13,16,16,12,13,15,16,16,
16,11,13,16,16,11,13,16,16,16,12,13,15,16,16,
16,16,16,16,16,16,16,16,16, 6, 8,11,13,16, 8,
8,10,12,16,11,10,11,13,16,12,13,13,15,16,16,16,
14,16,15, 6, 8,10,13,16, 8, 8,10,12,16,10,10,11,
13,16,13,12,13,16,16,14,14,16,16, 8, 9,11,13,
16, 8, 9,11,16,14,10,10,12,15,16,12,12,13,16,16,
15,16,16,16,10,12,15,16,16,10,12,12,14,16,12,
12,13,16,16,14,15,16,16,16,16,16,16,16,12,15,
15,16,16,13,13,16,16,14,14,16,16,16,16,16,16,
16,16,14,15,16,16,16, 8,10,13,15,16,10,11,13,16,
16,13,13,14,16,16,16,16,16,16,16,16,16,16,16,
8,10,11,15,16, 9,10,12,16,16,12,12,15,16,16,
14,16,16,16,16, 9,11,14,16,16,10,11
13,16,16,14,13,14,16,16,15,15,16,16,16,16,
16,16,11,13,16,16,16,11,13,15,16,16,13,16,16,16,
16,16,16,16,16,16,16,15,16,16,16,16,
14,16,16,16,16,16,16,16,16,16,16,16,16,16,
16,16,16,16, 9,13,16,16,16,11,13,16,16,14,15,
16,16,16,15,16,16,16,16,16,16,16, 9,13,15,
15,16,12,13,14,16,16,15,16,16,16,16,16,16,
16,16,16,16,16,16,11,13,15,16,16,12,14,16,16,16,
16,16,16,16,16,16,16,16,15,15,16,16,16,
16,16,16,16,16,16,16,16,16,16,16,16,16,
16,16,16,16,16,16,16,16,16,16,16,16,15,
16,16,13,16,16,16,16,16,16,16,16,16,16,16,
16};
```

-continued

```
int mlt_sqvh_code_category_3[625] = {

3,    8,   46,  145,  228,    4,    8,   47,   28,  455,   89,    2,  180,    5, 1335,  250,
   12,  644, 1311,  139,  729,  251,  870, 2172, 2211,    5,   23,  112,  334, 1469,   21,    3,
    5,  111, 2014,   88,   79,  152,  124, 2685,  297,   48,  110, 1310,  149,  501, 1231,  153,
 2267, 2569,   57,   13,  653, 2587,  143,   75,  124,  118, 2611, 5242,   61,   50,  253, 3633,
 2216,  476,   39,   57, 1926, 2236, 2586, 1329, 1920, 2566, 1926,  296,  233, 2590, 2240, 2217,
  253,  613,  867,  144,  318,  614,  252, 2589, 2242, 2218,  872,  866, 2187, 2296, 2155, 2568,
 2227,  150, 2567, 2296,  199, 2686, 2160, 2290, 19145,  232, 2680,  128, 2192, 2212, 2684,  793,
 2281, 2223, 2242, 1934, 2165, 2146, 2291, 2296, 2222, 2189, 2187, 2296, 2296,    6,    4,   82,
  725, 3632,   15,   21,   56,  599,  148,    3,  162,   42,  411, 2301,  735,  654,  930,  137,
 2586,  869, 1334, 1931, 2300, 2213,    9,   22,  146, 1290, 5240,    5,   12,   53,  630,  875,
   80,    9,    8,   86, 2002,  210,  117,   56, 2019, 2162,  146,  397,  868,  131, 2151,   77,
  160,  365, 2610, 2252,   59,   54,   41, 2591, 1928,  226,   14,  121, 5792, 2295, 1197,  728,
  408,  130, 2157, 3635,  155, 2573, 2587,  130,  314,   64,  144, 2173, 2176,  115,   30,  409,
  153, 2590,  631,   26, 4787, 2221, 2174, 2683, 1863, 2572,  319, 2150, 2177, 2194, 2571, 2257,
  319,   65,  145, 2251, 2156, 2161,  909,  864, 2193, 2197, 2246, 2588, 5797,  156, 2258, 2221,
 2158, 2199, 2214, 2152,  319, 2188, 2264, 2572,  319,  319,   30,  117,  219,  865, 2263,  147,
  127,  239,  410, 2247,   27,  324, 1468, 2681, 2180, 1328, 5241,  147,  142, 2237, 2241, 2245,
 1921, 2262,  142,   41,   11,  505, 2682, 2591,    0,   26,  229, 2015, 2577,  464,   98,   87,
 5243, 2166,  149, 2016, 5244, 2190, 2198, 9573, 11598, 11599, 2235, 2190,  144,  298, 1004, 5245,
 2277,  156,  104,  254, 2560, 1922,  612,  325, 2017,  129, 2588, 2608, 1330,  871, 2144, 2145,
  132, 2147, 2148, 2149, 2144,  119, 1331,  133, 2153, 2154,  211,   58, 2609, 1923, 2159,  510,
  163, 5246, 2163, 2164, 1924,  134, 2167, 2168, 2168, 2169, 2170, 2171, 2169, 2168, 1332,  135,
  136, 2175, 2153,  150,  873, 2178, 2179, 1923, 1925, 2181, 2182, 2183, 2163, 2184, 2185, 2186,
 2168, 2168, 1924,  134, 2167, 2168, 2168,   58,  326, 2687,  138, 2191,   31,   66,  874, 2195,
 2196,  151,  152, 1927, 2200, 2201, 2202, 2203, 2204, 2205, 2206, 2207, 2208, 2209, 2210, 2205,
   55,  103, 1230,  140, 2215,  118,   15, 1333, 2219, 2220, 2018,  511,  141, 2224, 2225, 2226,
 1929, 2228, 2229, 2230, 2231, 2232, 2233, 2234, 2229,  366, 1005, 1930, 2238, 2239,   12, 1006,
 5247, 2243, 2244, 1932, 3634, 1933, 2248, 2249, 2250,  145,  146, 2253, 2253, 2254, 2255, 2256,
 2253, 2253, 1291, 5793, 2259, 2260, 2261,  477, 5794,  147, 2265, 2266, 5795, 2268, 2269, 2270,
 2270, 2271, 2272, 2273, 2274, 2274, 2275, 2276, 2273, 2274, 2274,  148, 2278, 2279, 2280, 2260,
 1935, 2282, 2283, 2284, 2265, 2285, 2286, 2287, 2270, 2270, 2288, 2289, 2273, 2274, 2274, 2271,
 2272, 2273, 2274, 2274,  233, 5796, 2292, 2293, 2294, 1292, 3724, 2297, 2298, 2299, 2000,  151,
 2302, 2303, 2200,  152, 2561, 2562, 2563, 2205, 2564, 2565, 2204, 2205, 2205,  363,  154,  154,
  155, 2570,   59, 3725, 2001, 2574, 2575, 2576,  157, 2578, 2579, 2224, 2580, 2581, 2582, 2583,
 2229, 2584, 2585, 2228, 2229, 2229,  654, 5798,  158, 2589, 2238, 2392, 2003, 2592, 2593, 2243,
 2594, 2595, 2596, 2597, 2248, 2598, 2599, 2600, 2253, 2253, 2250,  145,  146, 2253, 2253, 2601,
 2602, 2603, 2604, 2260, 2605, 2606, 2607, 6336, 2265, 6337, 6338, 6339, 2270, 2270, 6340, 6341,
 2273, 2274, 2274, 2271, 2272, 2273, 2274, 2274, 6342, 6343, 2259, 2260, 2260, 38288, 38289,  147,
 2265, 2265, 5795, 2268, 2269, 2270, 2270, 2271, 2272, 2273, 2274, 2274, 2271, 2272, 2273, 2274,
 2274};
```

```
int mlt_sqvh_bitcount_category_4[256] = {

2, 4, 7,10, 4, 5, 7,10, 7, 8,10,14,11,11,15,15,
 4, 5, 9,12, 5, 5, 8,12, 8, 7,10,15,11,11,15,15,
 7, 9,12,15, 8, 8,12,15,10,10,13,15,14,14,15,13,
11,13,15,15,11,13,15,15,14,15,15,13,15,15,13,13,
 4, 5, 9,13, 5, 6, 9,13, 9, 9,11,15,14,13,15,15,
 4, 6, 9,12, 5, 6, 9,13, 9, 8,11,15,13,12,15,15,
 7, 9,12,15, 7, 8,11,15,10,10,14,15,14,15,15,14,
10,12,15,15,11,13,15,15,15,15,15,14,15,15,14,14,
 6, 9,13,14, 8, 9,12,15,12,12,15,15,15,15,15,15,
 7, 9,13,15, 8, 9,12,15,11,12,15,15,15,15,15,15,
 9,11,15,15, 9,11,15,15,14,14,15,15,15,15,15,15,
14,15,15,15,14,15,15,15,15,15,15,15,14,14,15,15,
 9,12,15,15,12,13,15,15,15,15,15,15,15,15,15,15,
10,12,15,15,12,14,15,15,15,15,15,15,15,15,15,15,
14,15,15,15,15,15,15,15,15,15,15,15,14,14,15,15,
15,15,15,15,15,15,15,14,14,15,15,15,14,14,15,15,};
```

```
int mlt_sqvh_code_category_4[256] = {

1, 2, 4, 572, 10, 0, 69, 712, 91, 10, 46, 9182, 1426, 1430, 30172, 30194,
 9, 28, 22, 2258, 16, 25, 142, 2179, 15, 111, 719, 1521, 1131, 1437, 1520, 30196,
 88, 293, 3803, 30193, 13, 236, 2856, 30166, 545, 951, 5709, 1522, 3241, 9180, 30179, 5709,
 1088, 4356, 30410, 30175, 1146, 377, 30162, 30163, 8715, 30176, 30165, 5709, 30197, 30184, 5709, 5709,
 1, 23, 29, 5710, 26, 14, 29, 7538, 102, 103, 1429, 1524, 3237, 7060, 30401, 30201,
 15, 13, 470, 3768, 24, 15, 281, 5747, 24, 181, 1128, 30206, 5711, 3531, 30156, 30158,
 116, 100, 2260, 30187, 119, 234, 1764, 30171, 716, 883, 9183, 30164, 3236, 1528, 30180, 9183,
 885, 2870, 1532, 30160, 1431, 5709, 30192, 30205, 30402, 30168, 30173, 9183, 30157, 30161, 9183, 9193,
 54, 25, 1621, 15211, 180, 287, 2261, 30198, 808, 811, 30411, 30413, 30414, 22986, 22987, 30411,
 24, 273, 376, 30159, 137, 280, 2871, 1523, 1768, 2259, 1525, 30167, 1526, 30169, 30170, 1525,
 443, 1434, 1527, 30174, 474, 1769, 30177, 30178, 3238, 3239, 30181, 30181, 30182, 30183, 30181, 30181,
 3240, 30185, 30186, 1527, 9181, 30188, 30189, 30177, 30190, 30191, 30181, 30181, 3238, 3239, 30181, 30181,
 440, 2857, 1529, 30195, 2294, 7061, 1530, 30199, 30200, 1531, 30202, 30411, 30203, 30204, 30411, 30411,
 203, 2872, 30207, 30400, 189, 11492, 30403, 30404, 30405, 30406, 30407, 1525, 30408, 30409, 1525, 1525,
```

-continued 8714, 1533, 30412, 1527, 1534, 1535, 30415, 30177, 30416, 30417, 30181, 30181, 3238, 3239, 30181, 30181,
30418, 30419, 1527, 1527, 30420, 30421, 30177, 30177, 3238, 3239, 30181, 30181, 3238, 3239, 30181, 30181};

int mlt_sqvh_bitcount_category_5[243] = {

2, 4, 8, 4, 5, 9, 9,10,14, 4, 6,11, 5, 6,12,10,
11,15, 9,11,15,10,13,15,14,15, 6, 4, 6,12, 6, 7,
12,12,12,15, 5, 7,13, 6, 7,13,12,13,15,10,12,15,
11,13,15,15,15, 7, 8,13,15,11,12,15,15,15, 7,10,
13,15,12,15,15,15, 7,15,15, 7,15,15, 7, 6, 7,
7, 4, 5,11, 5, 7,12,11,12,15, 6, 7,13, 7, 8,14,
12,14,15,11,13,15,12,13,15,15,15, 8, 5, 6,13, 7,
8,15,12,14,15, 6, 8,14, 7, 8,15,14,15,15,12,12,
15,12,13,15,15,15, 8, 9,13,15,12,13,15,15,15, 8,
11,13,15,13,13,15,15,15, 8,14,15, 8,15,15, 8, 7,
8, 8, 8,10,15,11,12,15,15,15, 7,10,12,15,12,13,
15,15,15, 8,14,15, 7,15,15, 8, 7, 8, 8, 8,12,15,
12,13,15,15,15, 8,11,13,15,13,15,15,15,15, 8,15,
15, 8,15,15, 8, 7, 8, 8,14,15, 6,15,15, 8, 7, 8,
8,15,15, 8,15,15, 8, 7, 8, 8, 6, 8, 8, 7, 8, 8,
7, 8, 8};

int mlt_sqvh_code_category_5[243] = {

0, 5, 220, 10, 16, 443, 390, 391, 14333, 11, 26, 1566, 26, 54, 3135, 508,
1558, 28581, 255, 1792, 28599, 885, 6208, 28578, 14335, 28579, 54, 9, 35, 3129, 27, 68,
3537, 1562, 3568, 28610, 25, 62, 4078, 58, 118, 7763, 3107, 7758, 28563, 778, 3131, 28599,
780, 7123, 28630, 28593, 28586, 118, 243, 6210, 28614, 1018, 3567, 29601, 28611, 28570, 69, 388,
6256, 28619, 1559, 28562, 28606, 28565, 28591, 118, 28594, 28571, 62, 28618, 28590, 118, 58, 118,
118, 4, 28, 1781, 31, 60, 3134, 1938, 3882, 28574, 25, 96, 7757, 49, 126, 14244,
3883, 14334, 28613, 1769, 4077, 28602, 3106, 7756, 28582, 28621, 28566, 126, 14, 61, 4079, 61,
138, 28491, 3536, 8153, 28573, 49, 96, 12442, 119, 240, 28490, 12443, 28560, 28561, 3111, 3580,
28564, 3130, 7759, 28567, 28569, 28569, 240, 444, 6209, 28572, 3569, 6211, 28575, 28576, 28577, 138,
778, 7760, 28580, 7761, 7762, 28583, 28584, 28585, 240, 14319, 28597, 96, 28588, 28589, 240, 119,
240, 240, 139, 968, 28592, 1554, 3581, 28595, 28596, 28597, 60, 971, 3560, 28600, 3582, 7132,
28603, 28604, 28605, 126, 14332, 28607, 96, 28608, 28609, 126, 49, 126, 126, 241, 1558, 28612,
1563, 6257, 28615, 28616, 28617, 138, 1559, 7133, 28620, 6220, 28622, 28623, 28624, 28625, 240, 28626,
28627, 96, 28628, 28629, 240, 119, 240, 240, 8152, 28631, 61, 28632, 28633, 138, 61, 138,
139, 29634, 28635, 96, 28636, 28637, 240, 119, 240, 240, 49, 96, 96, 119, 240, 240,
119, 240, 240}1 int mlt_sqvh_bitcount_category_6[32] = {

1, 4, 4, 6, 4, 6, 6, 8, 4, 6, 6, 8, 6, 9, 8,10,
4, 6, 7, 8, 6, 9, 8,11, 6, 9, 8,10, 8,10, 9,11};

int mlt_sqvh_code_category_6[32] = {

1,  2,  4,   2,  5,  29,  24,  101, 3, 31,  28,  105, 3,  5,  102, 424,
1, 30,  0, 107, 27, 200, 103,  806, 1,  4, 104, 402, 3, 425, 213, 807};
};

CODING THE MLT VECTOR INDICES (Module $52_0$–$52_{15}$)

The vector indices are transmitted on line 49 in spectral frequency order. They are coded in accordance with the variable bit-length codes defined in the tables above. The leftmost bits are transmitted first. Sign bits corresponding to non-zero scalar indices immediately follow each vector index code. The sign bits are also transmitted in spectral frequency order. (The encoding tables map some vector indices into codes which will be decoded as another vector index, when the first vector index has corresponding total power that exceeds the maximum possible for an entire region, that is, 20 times the square root of 2.)

RATE CONTROL (Module 62)

For each one of the 16 categorizations, the total number of bits actually required to represent the frame is computed. This includes the bits used to represent the power amplitude envelope, the 4 rate-control bits (i.e., an identification of the selected one of the 16 possible categorizations), and the bits needed for the SQVH coding of the MLT transform coefficients.

From the categorizations which yield bit totals that fit within the allotment, one is selected. (Some implementations may always select the lowest indexed categorization.) If none of the categorizations yields a bit total that fits within the allotment, the categorization that comes closest (normally 15) is selected. Then, code bits may be transmitted until the allotment for the frame is exhausted. Alternatively, some MLT transform coefficients may be requantized to indices that use fewer bits so that all code bits in the frame may be transmitted.

THE ENCODER BIT STREAM OUTPUT (Multiplexer 28)

There are three main data types transmitted on channel 27: power amplitude envelope, rate control (i.e., selected categorization) and SQVH MLT transform coefficient indices. The power amplitude envelope is transmitted first. It is transmitted in order from the lowest frequency region to the highest. The first region is coded with 5 bits. Each of the remaining 13 regions is coded with a variable number of bits.

Rate control on line 45 is transmitted next. Rate control always uses 4 bits. The SQVH MLT transform coefficient indices on line 49 are transmitted last. The SQVH codes are transmitted in spectral frequency order from lowest to highest. The SQVH MLT transform coefficient indices are coded with a variable number of bits. Depending on the categorization, some regions get no bits. Generally, some trailing fill-bits are needed to fill out a frame's allotment. The default for these bits is all 1's with a final zero.

| BIT FIELD ORDERING | |
|---|---|
| Amplitude Envelope | region 0: 5 bits |
| | region 1: variable number of bits |
| | region 2: variable number of bits |
| | region 3: variable number of bits |
| | region 4: variable number of bits |
| | region 5: variable number of bits |
| | region 6: variable number of bits |
| | region 7: variable number of bits |
| | region 8: variable number of bits |
| | region 9: variable number of bits |
| | region 10: variable number of bits |
| | region 11: variable number of bits |
| | region 12: variable number of bits |
| | region 13: variable number of bits |
| Rate Control | 4 bits |
| Scalar Quantized Vector Huffman MLT Frequency Coefficients | region 0: variable number of bits |
| | region 1: variable number of bits |
| | region 2: variable number of bits |
| | region 3: variable number of bits |
| | region 4: variable number of bits |
| | region 5: variable number of bits |
| | region 6: variable number of bits |
| | region 7: variable number of bits |
| | region 8: variable number of bits |
| | region 9: variable number of bits |
| | region 10: variable number of bits |
| | region 11: variable number of bits |
| | region 12: variable number of bits |
| | region 13: variable number of bits |
| Frame Fill | variable number of bits |

SQVH MLT Transform Coefficient Coding for One Region with N vectors

| | |
|---|---|
| vector amplitude index 0 | variable number of bits |
| sign bits for non-zero MLT freq. coefficients in vector amplitude index 0 | variable number of bits |
| vector amplitude index 1 | variable number of bits |
| sign bits for non-zero MLT freq. coefficients in vector amplitude index 1 | variable number of bits |
| . . . | |
| vector amplitude index N-1 | variable number of bits |
| sign bits for non-zero MLT freq. coefficients in vector amplitude index N-1 | variable number of bits |

EXAMPLE
THIS IS AN EXAMPLE OF KEY POINTS IN ENCODING ONE FRAME.

encoder mlt coefficients []:

| | | | | | | | | | | |
|---|---|---|---|---|---|---|---|---|---|---|
| 0–9: | 0.3 | 0.3 | 1.6 | 0.3 | −0.5 | 1.1 | −4.7 | 1.9 | 28.0 | −89.5 |
| 10–19: | 1203.0 | −678.9 | −51.9 | 19.7 | 2.5 | −2.1 | −5.6 | 5.0 | 11.0 | −11.0 |
| 20–29: | −14.1 | −201.1 | 275.0 | 33.8 | −10.4 | 1.7 | −3.7 | −1.2 | 3.8 | −4.0 |
| 30–39: | −23.8 | 91.4 | −260.4 | −159.6 | −37.5 | −16.7 | 40.8 | −22.9 | 43.6 | 5.1 |
| 40–49: | −8.7 | −100.6 | 271.8 | −420.8 | −483.0 | −167.0 | −47.3 | −32.6 | 20.2 | −3.8 |
| 50–59: | −1.0 | 0.8 | 18.1 | 14.7 | 137.3 | −131.7 | −52.1 | −6.2 | 7.5 | −0.5 |
| 60–69: | −6.0 | −6.8 | 1.6 | 10.3 | −21.1 | −43.6 | 35.5 | 17.4 | −2.4 | −3.6 |
| 70–79: | −2.9 | 5.4 | 0.8 | 8.5 | −20.2 | 6.9 | −2.5 | −5.5 | −0.7 | 9.2 |
| 80–89: | −4.0 | 0.5 | −5.3 | −2.8 | 8.0 | −11.5 | 24.0 | 5.4 | −11.0 | −18.0 |
| 90–99: | −6.1 | −0.2 | 1.8 | −3.0 | 0.8 | −6.4 | 8.0 | −7.0 | −4.4 | 1.0 |
| 100–109: | 1.4 | −1.3 | −0.0 | −0.2 | 0.3 | −0.5 | 5.2 | −3.8 | 3.6 | 4.8 |
| 110–119: | −0.5 | −0.5 | 0.7 | 1.8 | 1.7 | −0.6 | 1.3 | −2.4 | 3.6 | −2.6 |

-continued

| | | | | | | | | | | |
|---|---|---|---|---|---|---|---|---|---|---|
| 120–129: | −3.0 | −2.1 | −0.9 | −2.3 | −1.2 | −2.8 | 2.2 | −2.1 | 2.7 | −1.0 |
| 130–139: | 1.7 | −0.9 | −14.1 | −7.5 | 4.3 | −2.4 | −1.0 | 16.7 | −16.1 | 10.5 |
| 140–149: | −18.9 | 18.8 | 16.3 | −0.7 | −3.9 | −6.0 | 0.5 | 0.6 | −3.4 | 5.6 |
| 150–159: | −13.0 | 20.3 | −24.0 | −9.1 | 13.4 | 19.0 | 14.4 | 7.9 | 11.9 | −9.4 |
| 160–169: | 20.5 | −17.1 | 4.3 | 9.2 | −23.2 | −20.4 | −16.5 | −0.9 | 1.3 | 0.0 |
| 170–179: | 2.0 | −1.2 | 10.0 | −13.4 | 1.3 | 9.1 | 7.0 | −4.1 | −2.8 | −2.2 |
| 180–189: | −4.6 | 1.1 | −15.9 | 6.0 | −0.6 | −0.5 | 2.1 | 4.9 | −0.3 | −0.7 |
| 190–199: | 0.6 | −1.1 | −0.2 | 3.9 | −2.6 | 0.5 | 1.9 | −1.5 | −5.1 | −2.6 |
| 200–209: | −3.4 | −0.4 | 2.5 | −4.4 | 2.7 | 6.3 | −9.4 | 1.8 | 1.7 | −6.3 |
| 210–219: | −8.2 | −13.7 | −3.3 | 0.1 | −0.3 | −1.1 | 3.2 | −4.5 | −0.6 | 1.4 |
| 220–229: | −1.7 | −0.3 | −1.0 | −0.4 | −0.1 | 0.1 | 0.1 | −0.0 | 0.1 | 0.1 |
| 230–239: | −0.1 | −0.0 | −0.0 | −0.1 | −0.1 | −0.1 | 0.0 | 0.0 | −0.1 | −0.1 |
| 240–249: | 0.1 | −0.0 | 0.1 | 0.0 | 0.0 | 0.1 | 0.1 | −0.0 | −0.0 | −0.0 |
| 250–259: | 0.1 | 0.1 | 0.1 | −0.0 | −0.1 | −0.0 | −0.2 | −0.1 | 0.2 | −0.2 |
| 260–269: | 0.2 | −0.1 | −0.0 | −0.2 | 0.3 | 0.3 | 0.2 | 0.2 | −0.7 | −0.2 |
| 270–279: | −0.0 | −0.6 | 0.1 | 0.7 | −0.4 | −0.2 | −2.4 | 1.1 | −0.2 | −0.3 | encoder amplitude envelope:

| region: | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| actual rms[]: | 310 | 106 | 168 | 15 | 9 | 2 | 7 | 13 | 11 | 4 | 5 | 0 | 0 | 1 |
| qntzd rms []: | 362 | 91 | 181 | 16 | 8 | 3 | 8 | 11 | 11 | 4 | 6 | 0 | 0 | 1 |
| rms_index[]: | 15 | 11 | 13 | 6 | 4 | 1 | 4 | 5 | 5 | 2 | 3 | −4 | −9 | −3 |
| bit count: | 5 | 4 | 7 | 4 | 3 | 4 | 4 | 3 | 2 | 3 | 3 | 6 | 5 | 7 | total rms_index[] bits = 6

CATEGORIZATION PROCEDURE number of bits per frame = 320
number of rate control bits = 4
number of available bits = 256

BINARY SEARCH FOR OFFSET THAT YIELDS AN INITIAL CATEGORIZATION WITH EXPECTED BIT COUNT CLOSE TO THE NUMBER OF AVAILABLE BITS

| | 0 | 1 | 2 | 3 | 4 | 5 | 6 | 7 | 8 | 9 | 10 | 11 | 12 | 13 | |
|---|---|---|---|---|---|---|---|---|---|---|---|---|---|---|---|
| 0: | 0 | 0 | 0 | 0 | 0 | 0 | 0 | 0 | 0 | 0 | 0 | 1 | 3 | 0 | |
| | 52 | 52 | 52 | 52 | 52 | 52 | 52 | 52 | 52 | 52 | 52 | 47 | 37 | 52 | 708 |
| 16: | 0 | 1 | 0 | 4 | 5 | 6 | 5 | 4 | 4 | 6 | 5 | 7 | 7 | 7 | |
| | 52 | 47 | 52 | 29 | 22 | 16 | 22 | 29 | 29 | 16 | 22 | 0 | 0 | 0 | 336 |
| 24: | 3 | 5 | 4 | 7 | 7 | 7 | 7 | 7 | 7 | 7 | 7 | 7 | 7 | 7 | |
| | 37 | 22 | 29 | 0 | 0 | 0 | 0 | 0 | 0 | 0 | 0 | 0 | 0 | 0 | 88 |
| 20: | 1 | 3 | 2 | 6 | 7 | 7 | 7 | 6 | 6 | 7 | 7 | 7 | 7 | 7 | |
| | 47 | 37 | 43 | 16 | 0 | 0 | 0 | 16 | 16 | 0 | 0 | 0 | 0 | 0 | 175 |
| 18: | 0 | 2 | 1 | 5 | 6 | 7 | 6 | 5 | 5 | 7 | 6 | 7 | 7 | 7 | |
| | 52 | 43 | 47 | 22 | 16 | 0 | 16 | 22 | 22 | 0 | 16 | 0 | 0 | 0 | 256 |
| 19: | 1 | 3 | 2 | 5 | 6 | 7 | 6 | 6 | 6 | 7 | 7 | 7 | 7 | 7 | |
| | 47 | 37 | 43 | 22 | 16 | 0 | 16 | 16 | 16 | 0 | 0 | 0 | 0 | 0 | 213 |

THE INITIAL CATEGORIZATION IS ASSOCIATED WITH OFFSET = 18

| 0 | 2 | 1 | 5 | 6 | 7 | 6 | 5 | 5 | 7 | 6 | 7 | 7 | 7 | |
|---|---|---|---|---|---|---|---|---|---|---|---|---|---|---|
| 52 | 43 | 47 | 22 | 16 | 0 | 16 | 22 | 22 | 0 | 16 | 0 | 0 | 0 | 256 |

THE CATEGORIZATION PROCEDURE NOW DETERMINES THE FOLLOWING 16 CATEGORIZATIONS
Category For Each Categorization By Region

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0: | 0 | 1 | 0 | 4 | 5 | 6 | 5 | 5 | 5 | 6 | 6 | 7 | 7 | 7 |
| 1: | 0 | 1 | 0 | 4 | 5 | 7 | 5 | 5 | 5 | 6 | 6 | 7 | 7 | 7 |
| 2: | 0 | 1 | 1 | 4 | 5 | 7 | 5 | 5 | 5 | 6 | 6 | 7 | 7 | 7 |
| 3: | 0 | 2 | 1 | 4 | 5 | 7 | 5 | 5 | 5 | 6 | 6 | 7 | 7 | 7 |
| 4: | 0 | 2 | 1 | 4 | 5 | 7 | 5 | 5 | 5 | 7 | 6 | 7 | 7 | 7 |
| 5: | 0 | 2 | 1 | 4 | 5 | 7 | 6 | 5 | 5 | 7 | 6 | 7 | 7 | 7 |
| 6: | 0 | 2 | 1 | 4 | 6 | 7 | 6 | 5 | 5 | 7 | 6 | 7 | 7 | 7 |
| 7: | 0 | 2 | 1 | 5 | 6 | 7 | 6 | 5 | 5 | 7 | 6 | 7 | 7 | 7 |
| 8: | 0 | 2 | 1 | 5 | 6 | 7 | 6 | 5 | 5 | 7 | 7 | 7 | 7 | 7 |
| 9: | 0 | 2 | 1 | 5 | 6 | 7 | 6 | 5 | 6 | 7 | 7 | 7 | 7 | 7 |
| 10: | 0 | 2 | 1 | 5 | 6 | 7 | 6 | 6 | 6 | 7 | 7 | 7 | 7 | 7 |
| 11: | 0 | 2 | 2 | 5 | 6 | 7 | 6 | 6 | 6 | 7 | 7 | 7 | 7 | 7 |
| 12: | 0 | 3 | 2 | 5 | 6 | 7 | 6 | 6 | 6 | 7 | 7 | 7 | 7 | 7 |
| 13: | 1 | 3 | 2 | 5 | 6 | 7 | 6 | 6 | 7 | 7 | 7 | 7 | 7 | 7 |
| 14: | 1 | 3 | 2 | 5 | 6 | 7 | 7 | 6 | 6 | 7 | 7 | 7 | 7 | 7 |
| 15: | 1 | 3 | 2 | 5 | 7 | 7 | 7 | 6 | 6 | 7 | 7 | 7 | 7 | 7 |

THE FOLLOWING TABLE SHOWS THE EXPECTED BIT TOTALS BY REGION FOR THE 16 CATEGORIZATIONS

-continued

Expected Number Of Bits For Each Categorization By Region

|    | 0  | 1  | 2  | 3  | 4  | 5  | 6  | 7  | 8  | 9  | 10 | 11 | 12 | 13 | total |
|----|----|----|----|----|----|----|----|----|----|----|----|----|----|----|-------|
| 0: | 52 | 47 | 52 | 29 | 22 | 16 | 22 | 22 | 22 | 16 | 16 | 0  | 0  | 0  | 316   |
| 1: | 52 | 47 | 52 | 29 | 22 | 0  | 22 | 22 | 22 | 16 | 16 | 0  | 0  | 0  | 300   |
| 2: | 52 | 47 | 47 | 29 | 22 | 0  | 22 | 22 | 22 | 16 | 16 | 0  | 0  | 0  | 295   |
| 3: | 52 | 43 | 47 | 29 | 22 | 0  | 22 | 22 | 22 | 16 | 16 | 0  | 0  | 0  | 291   |
| 4: | 52 | 43 | 47 | 29 | 22 | 0  | 22 | 22 | 22 | 0  | 16 | 0  | 0  | 0  | 275   |
| 5: | 52 | 43 | 47 | 29 | 22 | 0  | 16 | 22 | 22 | 0  | 16 | 0  | 0  | 0  | 269   |
| 6: | 52 | 43 | 47 | 29 | 16 | 0  | 16 | 22 | 22 | 0  | 16 | 0  | 0  | 0  | 263   |
| 7: | 52 | 43 | 47 | 22 | 16 | 0  | 16 | 22 | 22 | 0  | 16 | 0  | 0  | 0  | 256   |
| 8: | 52 | 43 | 47 | 22 | 16 | 0  | 16 | 22 | 22 | 0  | 0  | 0  | 0  | 0  | 240   |
| 9: | 52 | 43 | 47 | 22 | 16 | 0  | 16 | 22 | 16 | 0  | 0  | 0  | 0  | 0  | 234   |
| 10:| 52 | 43 | 47 | 22 | 16 | 0  | 16 | 16 | 16 | 0  | 0  | 0  | 0  | 0  | 228   |
| 11:| 52 | 43 | 43 | 22 | 16 | 0  | 16 | 16 | 16 | 0  | 0  | 0  | 0  | 0  | 224   |
| 12:| 52 | 37 | 43 | 22 | 16 | 0  | 16 | 16 | 16 | 0  | 0  | 0  | 0  | 0  | 219   |
| 13:| 47 | 37 | 43 | 22 | 16 | 0  | 16 | 16 | 16 | 0  | 0  | 0  | 0  | 0  | 213   |
| 14:| 47 | 37 | 43 | 22 | 16 | 0  | 0  | 16 | 16 | 0  | 0  | 0  | 0  | 0  | 197   |
| 15:| 47 | 37 | 43 | 22 | 0  | 0  | 0  | 16 | 16 | 0  | 0  | 0  | 0  | 0  | 181   |

THE FOLLOWING TABLES SHOW THE ACTUAL BIT TOTALS BY REGION AND CATEGORY region = 0 category = 0

| mlt coefficients | scalar indices | vector index | sqvh bit count | sign bit count |
|---|---|---|---|---|
| 0.3 | 0.3 | 0 | 0 | 1 | 0 |
| 1.6 | 0.3 | 0 | 0 | 1 | 0 |
| -0.5 | 1.1 | 0 | 0 | 1 | 0 |
| -4.7 | 1.9 | 0 | 0 | 1 | 0 |
| 28.0 | -89.5 | 0 | 0 | 1 | 0 |
| 1203.0 | -678.9 | 9 | 5 | 131 | 10 | 2 |
| -51.9 | 19.7 | 0 | 0 | 1 | 0 |
| 2.5 | -2.1 | 0 | 0 | 1 | 0 |
| -5.6 | 5.0 | 0 | 0 | 1 | 0 |
| 11.0 | -11.0 | 0 | 0 | 1 | 0 |

Note: rows have columns: mlt coefficients, scalar indices, vector index, sqvh bit count, sign bit count.

region = 0 category = 1

| mlt coefficients | scalar indices | vector index | sqvh bit count | sign bit count |
|---|---|---|---|---|
| 0.3 | 0.3 | 0 | 0 | 1 | 0 |
| 1.6 | 0.3 | 0 | 0 | 1 | 0 |
| -0.5 | 1.1 | 0 | 0 | 1 | 0 |
| -4.7 | 1.9 | 0 | 0 | 1 | 0 |
| 28.0 | -89.5 | 0 | 0 | 1 | 0 |
| 1203.0 | -678.9 | 6 | 4 | 64 | 10 | 2 |
| -51.9 | 19.7 | 0 | 0 | 1 | 0 |
| 2.5 | -2.1 | 0 | 0 | 1 | 0 |
| -5.6 | 5.0 | 0 | 0 | 1 | 0 |
| 11.0 | -11.0 | 0 | 0 | 1 | 0 | region = 1 category = 1

| mlt coefficients | scalar indices | vector index | sqvh bit count | sign bit count |
|---|---|---|---|---|
| -14.1 | -201.1 | 0 | 4 | 4 | 7 | 1 |
| 275.0 | 33.5 | 6 | 1 | 61 | 8 | 2 |
| -10.4 | 1.7 | 0 | 0 | 0 | 1 | 0 |
| -3.7 | -1.2 | 0 | 0 | 0 | 1 | 0 |
| 3.8 | -4.0 | 0 | 0 | 0 | 1 | 0 |
| -23.8 | 91.4 | 0 | 2 | 2 | 5 | 1 |
| -260.4 | -159.6 | 6 | 3 | 63 | 9 | 2 |
| -37.5 | -16.7 | 1 | 0 | 10 | 4 | 1 |
| 40.8 | -22.9 | 1 | 0 | 10 | 4 | 1 |
| 43.6 | 5.1 | 1 | 0 | 10 | 4 | 1 | region = 1 category = 2

| mlt coefficients | scalar indices | vector index | sqvh bit count | sign bit count |
|---|---|---|---|---|
| -14.1 | -201.1 | 0 | 3 | 3 | 7 | 1 |
| 275.0 | 33.8 | 4 | 0 | 28 | 8 | 1 |
| -10.4 | 1.7 | 0 | 0 | 0 | 1 | 0 |

-continued

| mlt coefficients | | scalar indices | | | | vector index | sqvh bit count | sign bit count |
|---|---|---|---|---|---|---|---|---|
| −3.7 | −1.2 | 0 | 0 | 0 | | 1 | | 0 |
| 3.8 | −4.0 | 0 | 0 | 0 | | 1 | | 0 |
| −23.8 | 91.4 | 0 | 1 | 1 | | 4 | | 1 |
| −260.4 | −159.6 | 4 | 2 | 30 | | 8 | | 2 |
| −37.5 | −16.7 | 0 | 0 | 0 | | 1 | | 0 |
| 40.6 | −22.9 | 0 | 0 | 0 | | 1 | | 0 |
| 43.6 | 5.1 | 1 | 0 | 7 | | 3 | | 1 | region = 1 category = 3

| mlt coefficients | | | | scalar indices | | | | vector index | sqvh bit count | sign bit count |
|---|---|---|---|---|---|---|---|---|---|---|
| −14.1 | −201.1 | 275.0 | 33.8 | 0 | 2 | 3 | 0 | 65 | 11 | 2 |
| −10.4 | 1.7 | −3.7 | −1.2 | 0 | 0 | 0 | 0 | 0 | 2 | 0 |
| 3.8 | −4.0 | −23.8 | 91.4 | 0 | 0 | 0 | 1 | 1 | 4 | 1 |
| −260.4 | −159.6 | −37.5 | −16.7 | 3 | 2 | 0 | 0 | 425 | 9 | 2 |
| 40.1 | −22.9 | 43.6 | 5.1 | 0 | 0 | 0 | 0 | 0 | 2 | 0 | region = 2 category = 0

| mlt coefficients | | scalar indices | | vector index | sqvh bit count | sign bit count |
|---|---|---|---|---|---|---|
| −8.7 | −100.6 | 0 | 1 | 1 | 4 | 1 |
| 271.8 | −420.8 | 4 | 6 | 62 | 10 | 2 |
| −483.0 | −167.0 | 7 | 2 | 100 | 9 | 2 |
| −47.3 | −32.6 | 1 | 0 | 14 | 4 | 1 |
| 20.2 | −3.8 | 0 | 0 | 0 | 1 | 0 |
| −1.0 | 0.8 | 0 | 0 | 0 | 1 | 0 |
| 18.1 | 14.7 | 0 | 0 | 0 | 1 | 0 |
| 137.3 | −131.7 | 2 | 2 | 30 | 7 | 2 |
| −52.1 | −6.2 | 1 | 0 | 14 | 4 | 1 |
| 7.5 | −0.5 | 0 | 0 | 0 | 1 | 0 | region = 2 category = 1

| mlt coefficients | | scalar indices | | vector index | sqvh bit count | sign bit count |
|---|---|---|---|---|---|---|
| −8.7 | −100.6 | 0 | 1 | 1 | 4 | 1 |
| 271.8 | −420.8 | 3 | 4 | 34 | 8 | 2 |
| −483.0 | −167.0 | 5 | 2 | 52 | 8 | 2 |
| −47.3 | −32.6 | 0 | 0 | 0 | 1 | 0 |
| 20.2 | −3.8 | 0 | 0 | 0 | 1 | 0 |
| −1.0 | 0.8 | 0 | 0 | 0 | 1 | 0 |
| 18.1 | 14.7 | 0 | 0 | 0 | 1 | 0 |
| 137.3 | −131.7 | 1 | 1 | 11 | 5 | 2 |
| −52.1 | −6.2 | 0 | 0 | 0 | 1 | 0 |
| 7.5 | −0.5 | 0 | 0 | 0 | 1 | 0 | region = 2 category = 2

| mlt coefficients | | scalar indices | | vector index | sqvh bit count | sign bit count |
|---|---|---|---|---|---|---|
| −8.7 | −100.6 | 0 | 1 | 1 | 4 | 1 |
| 271.8 | −420.8 | 2 | 3 | 17 | 7 | 2 |
| −483.0 | −167.0 | 4 | 1 | 29 | 8 | 2 |
| −47.3 | −32.6 | 0 | 0 | 0 | 1 | 0 |
| 20.2 | −3.8 | 0 | 0 | 0 | 1 | 0 |
| −1.0 | 0.8 | 0 | 0 | 0 | 1 | 0 |
| 18.1 | 14.7 | 0 | 0 | 0 | 1 | 0 |
| 137.3 | −131.7 | 1 | 1 | 8 | 4 | 2 |
| −52.1 | −6.2 | 0 | 0 | 0 | 1 | 0 |
| 7.5 | −0.5 | 0 | 0 | 0 | 1 | 0 | region = 3 category = 4

| mlt coefficients | | | | scalar indices | | | | vector index | sqvh bit count | sign bit count |
|---|---|---|---|---|---|---|---|---|---|---|
| −6.0 | −6.8 | 1.6 | 10.3 | 0 | 0 | 0 | 0 | 0 | 2 | 0 |
| −21.1 | −43.6 | 35.5 | 17.4 | 1 | 2 | 1 | 1 | 101 | 8 | 4 |
| −2.4 | −3.6 | −2.9 | 5.4 | 0 | 0 | 0 | 0 | 0 | 2 | 0 |
| 0.8 | 8.5 | −20.2 | 6.9 | 0 | 0 | 1 | 0 | 4 | 4 | 1 |
| −2.5 | −5.5 | −0.7 | 9.2 | 0 | 0 | 0 | 0 | 0 | 2 | 0 |

-continued region = 3 category = 5

| mlt coefficients | | | | | scalar indices | | | | | vector index | sqvh bit count | sign bit count |
|---|---|---|---|---|---|---|---|---|---|---|---|---|
| −6.0 | −6.8 | 1.6 | 10.3 | −21.1 | 0 | 0 | 0 | 0 | 1 | 1 | 4 | 1 |
| −43.6 | 35.5 | 17.4 | −2.4 | −3.6 | 1 | 1 | 0 | 0 | 0 | 108 | 5 | 2 |
| −2.9 | 5.4 | 0.8 | 8.5 | −20.2 | 0 | 0 | 0 | 0 | 1 | 1 | 4 | 1 |
| 6.9 | −2.5 | −5.5 | −0.7 | 9.2 | 0 | 0 | 0 | 0 | 0 | 0 | 2 | 0 | region = 4 category = 5

| mlt coefficients | | | | | scalar indices | | | | | vector index | sqvh bit count | sign bit count |
|---|---|---|---|---|---|---|---|---|---|---|---|---|
| −4.0 | 0.5 | −5.3 | −2.8 | 8.0 | 0 | 0 | 0 | 0 | 0 | 0 | 2 | 0 |
| −11.5 | 24.0 | 5.4 | −11.0 | −18.0 | 1 | 1 | 0 | 1 | 1 | 112 | 8 | 4 |
| −6.1 | −0.2 | 1.8 | −3.0 | 0.8 | 0 | 0 | 0 | 0 | 0 | 0 | 2 | 0 |
| −6.4 | 8.0 | −7.0 | −4.4 | 1.0 | 0 | 0 | 0 | 0 | 0 | 0 | 2 | 0 | region = 4 category = 6

| mlt coefficients | | | | | scalar indices | | | | | vector index | sqvh bit count | sign bit count |
|---|---|---|---|---|---|---|---|---|---|---|---|---|
| −4.0 | 0.5 | −5.3 | −2.8 | 8.0 | 0 | 0 | 0 | 0 | 0 | 0 | 1 | 0 |
| −11.5 | 24.0 | 5.4 | −11.0 | −18.0 | 1 | 1 | 0 | 0 | 1 | 25 | 9 | 3 |
| −6.1 | −0.2 | 1.8 | −3.0 | 0.8 | 0 | 0 | 0 | 0 | 0 | 0 | 1 | 0 |
| −6.4 | 8.0 | −7.0 | −4.4 | 1.0 | 0 | 0 | 0 | 0 | 0 | 0 | 1 | 0 | region = 5 category = 6

| mlt coefficients | | | | | scalar indices | | | | | vector index | sqvh bit count | sign bit count |
|---|---|---|---|---|---|---|---|---|---|---|---|---|
| 1.4 | −1.3 | −0.0 | −0.2 | 0.3 | 0 | 0 | 0 | 0 | 0 | 0 | 1 | 0 |
| −0.5 | 5.2 | −3.8 | 3.6 | 4.8 | 0 | 1 | 0 | 0 | 1 | 9 | 6 | 2 |
| −0.5 | −0.5 | 0.7 | 1.8 | 1.7 | 0 | 0 | 0 | 0 | 0 | 0 | 1 | 0 |
| −0.6 | 1.3 | −2.4 | 3.6 | −2.6 | 0 | 0 | 0 | 0 | 0 | 0 | 1 | 0 | region = 6 category = 5

| mlt coefficients | | | | | scalar indices | | | | | vector index | sqvh bit count | sign bit count |
|---|---|---|---|---|---|---|---|---|---|---|---|---|
| −3.0 | −2.1 | −0.9 | −2.3 | −1.2 | 0 | 0 | 0 | 0 | 0 | 0 | 2 | 0 |
| −2.8 | 2.2 | −2.1 | 2.7 | −1.0 | 0 | 0 | 0 | 0 | 0 | 0 | 2 | 0 |
| 1.7 | −0.9 | −14.1 | −7.5 | 4.3 | 0 | 0 | 1 | 0 | 0 | 9 | 4 | 1 |
| −2.4 | −1.0 | 16.7 | −16.1 | 10.5 | 0 | 0 | 1 | 1 | 1 | 13 | 6 | 3 | region = 6 category = 6

| mlt coefficients | | | | | scalar indices | | | | | vector index | sqvh bit count | sign bit count |
|---|---|---|---|---|---|---|---|---|---|---|---|---|
| −3.0 | −2.1 | −0.9 | −2.3 | −1.2 | 0 | 0 | 0 | 0 | 0 | 0 | 1 | 0 |
| −2.8 | 2.2 | −2.1 | 2.7 | −1.0 | 0 | 0 | 0 | 0 | 0 | 0 | 1 | 0 |
| 1.7 | −0.9 | −14.1 | −7.5 | 4.3 | 0 | 0 | 1 | 0 | 0 | 4 | 4 | 1 |
| −2.4 | −1.0 | 16.7 | −16.1 | 10.5 | 0 | 0 | 1 | 1 | 0 | 6 | 6 | 2 | region = 7 category = 5

| mlt coefficients | | | | | scalar indices | | | | | vector index | sqvh bit count | sign bit count |
|---|---|---|---|---|---|---|---|---|---|---|---|---|
| −18.9 | 18.8 | 16.3 | −0.7 | −3.9 | 1 | 1 | 1 | 0 | 0 | 117 | 6 | 3 |
| −6.0 | 0.5 | 0.6 | −3.4 | 5.6 | 0 | 0 | 0 | 0 | 0 | 0 | 2 | 0 |
| −13.0 | 20.3 | −24.0 | −9.1 | 13.4 | 1 | 1 | 1 | 0 | 1 | 118 | 8 | 4 |
| 19.0 | 14.4 | 7.9 | 11.9 | −9.4 | 1 | 1 | 0 | 0 | 0 | 108 | 5 | 2 | region = 7 category = 6

| mlt coefficients | | | | | scalar indices | | | | | vector index | sqvh bit count | sign bit count |
|---|---|---|---|---|---|---|---|---|---|---|---|---|
| −18.9 | 18.8 | 16.3 | −0.7 | −3.9 | 1 | 1 | 1 | 0 | 0 | 28 | 8 | 1 |
| −6.0 | 0.5 | 0.6 | −3.4 | 5.6 | 0 | 0 | 0 | 0 | 0 | 0 | 1 | 0 |
| −13.0 | 20.3 | −24.0 | −9.1 | 13.4 | 0 | 1 | 1 | 0 | 0 | 12 | 6 | 2 |
| 19.0 | 14.4 | 7.9 | 11.9 | −9.4 | 1 | 0 | 0 | 0 | 0 | 16 | 4 | 1 | region = 8 category = 5

| mlt coefficients | | | | | scalar indices | | | | | vector index | sqvh bit count | sign bit count |
|---|---|---|---|---|---|---|---|---|---|---|---|---|
| 20.5 | -17.1 | 4.3 | 9.2 | -23.2 | 1 | 1 | 0 | 0 | 1 | 109 | 6 | 3 |
| -20.4 | -16.5 | -0.9 | 1.3 | 0.0 | 1 | 1 | 0 | 0 | 0 | 108 | 5 | 2 |
| 2.0 | -1.2 | 10.0 | -13.4 | 1.3 | 0 | 0 | 0 | 1 | 0 | 3 | 4 | 1 |
| 9.1 | 7.0 | -4.1 | -2.0 | -2.2 | 0 | 0 | 0 | 0 | 0 | 0 | 2 | 0 | region = 8 category = 6

| mlt coefficients | | | | | scalar indices | | | | | vector index | sqvh bit count | sign bit count |
|---|---|---|---|---|---|---|---|---|---|---|---|---|
| 20.5 | -17.1 | 4.3 | 9.2 | -23.2 | 1 | 1 | 0 | 0 | 1 | 25 | 9 | 3 |
| -20.4 | -16.5 | -0.9 | 1.3 | 0.0 | 1 | 1 | 0 | 0 | 0 | 24 | 6 | 2 |
| 2.0 | -1.2 | 10.0 | -13.4 | 1.3 | 0 | 0 | 0 | 0 | 0 | 0 | 1 | 0 |
| 9.1 | 7.0 | -4.1 | -2.8 | -2.2 | 0 | 0 | 0 | 0 | 0 | 0 | 1 | 0 | region = 9 category = 6

| mlt coefficients | | | | | scalar indices | | | | | vector index | sqvh bit count | sign bit count |
|---|---|---|---|---|---|---|---|---|---|---|---|---|
| -4.6 | 1.1 | -15.9 | 6.0 | -0.6 | 0 | 0 | 1 | 1 | 0 | 6 | 6 | 2 |
| -0.5 | 2.1 | 4.9 | -0.3 | -0.7 | 0 | 0 | 0 | 0 | 0 | 0 | 1 | 0 |
| 0.6 | -1.1 | -0.2 | 3.9 | -2.6 | 0 | 0 | 0 | 0 | 0 | 0 | 1 | 0 |
| 0.5 | 1.9 | -1.5 | -5.1 | -2.6 | 0 | 0 | 0 | 0 | 0 | 0 | 1 | 0 | region = 10 category = 6

| mlt coefficients | | | | | scalar indices | | | | | vector index | sqvh bit count | sign bit count |
|---|---|---|---|---|---|---|---|---|---|---|---|---|
| -3.4 | -0.4 | 2.5 | -4.4 | 2.7 | 0 | 0 | 0 | 0 | 0 | 0 | 1 | 0 |
| 6.3 | -9.4 | 1.8 | 1.7 | -6.3 | 0 | 1 | 0 | 0 | 0 | 8 | 4 | 1 |
| -0.2 | -13.7 | -3.3 | 0.1 | -0.3 | 1 | 1 | 0 | 0 | 0 | 24 | 6 | 2 |
| -1.1 | 3.2 | -4.5 | -0.6 | 1.4 | 0 | 0 | 0 | 0 | 0 | 0 | 1 | 0 |

THE FOLLOWING TABLE SHOWS THE ACTUAL BIT TOTALS BY REGION FOR THE 16 CATEGORIZATIONS
Actual Number of Bits For Each Categorization By Region

|  | 0 | 1 | 2 | 3 | 4 | 5 | 6 | 7 | 8 | 9 | 10 | 11 | 12 | 13 | total |
|---|---|---|---|---|---|---|---|---|---|---|---|---|---|---|---|
| 0: | 21 | 53 | 51 | 23 | 18 | 11 | 18 | 30 | 23 | 11 | 15 | 0 | 0 | 0 | 274 |
| 1: | 21 | 53 | 51 | 23 | 18 | 0 | 18 | 30 | 23 | 11 | 15 | 0 | 0 | 0 | 263 |
| 2: | 21 | 53 | 38 | 23 | 18 | 0 | 18 | 30 | 23 | 11 | 15 | 0 | 0 | 0 | 250 |
| 3: | 21 | 41 | 38 | 23 | 18 | 0 | 18 | 30 | 23 | 11 | 15 | 0 | 0 | 0 | 238 |
| 4: | 21 | 41 | 38 | 23 | 18 | 0 | 18 | 30 | 23 | 0 | 15 | 0 | 0 | 0 | 227 |
| 5: | 21 | 41 | 38 | 23 | 18 | 0 | 15 | 30 | 23 | 0 | 15 | 0 | 0 | 0 | 224 |
| 6: | 21 | 41 | 38 | 23 | 15 | 0 | 15 | 30 | 23 | 0 | 15 | 0 | 0 | 0 | 221 |
| 7: | 21 | 41 | 38 | 19 | 15 | 0 | 15 | 30 | 23 | 0 | 15 | 0 | 0 | 0 | 217 |
| 8: | 21 | 41 | 38 | 19 | 15 | 0 | 15 | 30 | 23 | 0 | 0 | 0 | 0 | 0 | 202 |
| 9: | 21 | 41 | 38 | 19 | 15 | 0 | 15 | 30 | 22 | 0 | 0 | 0 | 0 | 0 | 201 |
| 10: | 21 | 41 | 38 | 19 | 15 | 0 | 15 | 25 | 22 | 0 | 0 | 0 | 0 | 0 | 196 |
| 11: | 21 | 41 | 36 | 19 | 15 | 0 | 15 | 25 | 22 | 0 | 0 | 0 | 0 | 0 | 194 |
| 12: | 21 | 33 | 36 | 19 | 15 | 0 | 15 | 25 | 22 | 0 | 0 | 0 | 0 | 0 | 186 |
| 13: | 21 | 33 | 36 | 19 | 15 | 0 | 15 | 25 | 22 | 0 | 0 | 0 | 0 | 0 | 186 |
| 14: | 21 | 33 | 36 | 19 | 15 | 0 | 0 | 25 | 22 | 0 | 0 | 0 | 0 | 0 | 171 |
| 15: | 21 | 33 | 36 | 19 | 0 | 0 | 0 | 25 | 22 | 0 | 0 | 0 | 0 | 0 | 156 |

Rate Control (categorization selection) = 2
The category assignments for the selected categorization are:

0  1  1  4  5  7  5  5  5  6  6  7  7  7
The actual mlt coefficient SQVH code bit plus sign bit totals are:

21  53  38  23  18  0  18  30  23  11  15  0  0  0
The total number of mlt coefficient SQVH code bits plus sign bits is 250
The bitstream consists of:

60 amplitude envelope bits
4 rate control bits
250 mlt coefficient SQVH code bits plus sign bits
6 frame-fill bits 320 bits

DECODER 30

Figure 5:
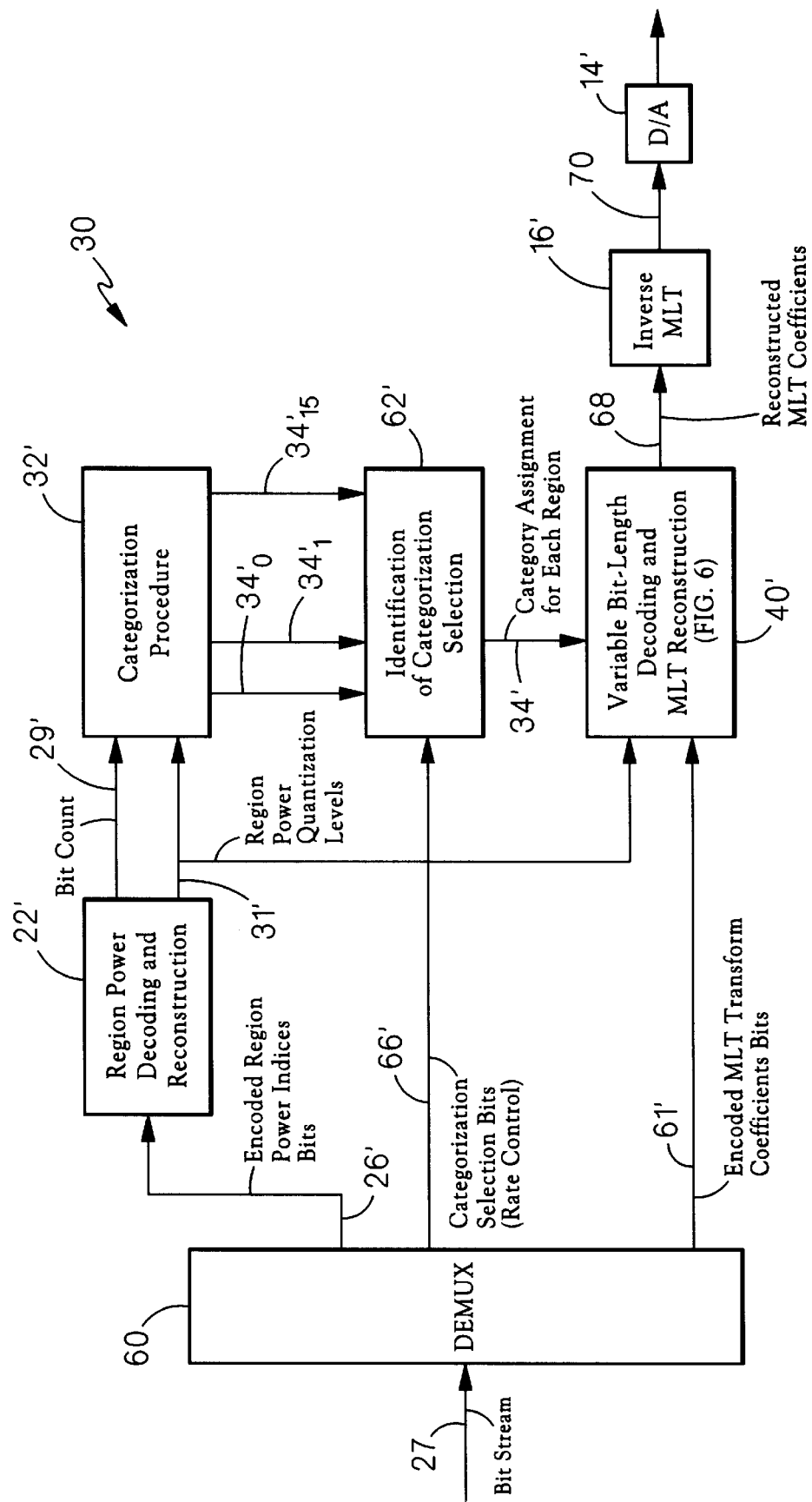
FIG. 5 is decoder adapted to decode an audio signal encoded by the encoder of FIG. 3 in accordance with the invention.

Referring now to FIG. 5, decoder 30 is shown to include a demultiplexer 60 for demultiplexing the data, i.e., bit stream, on channel 27 into power amplitude quantization indices on line 26', rate control on line 66', and quantized and encoded transform coefficients on line 61', as shown. The quantized power in each of the regions is decoded and reconstructed from the transmitted quantized power indices in module 22'. The region power quantization levels are produced on line 31' and the bit count thereof is produced on line 29'. The same set of categorizations that the encoder 9 (FIG. 4) determined are determined using the quantized power indices and the number of bits remaining after region power decoding in module 32'. More particularly, categorization module 32' produces the 16 categorizations Categorization0–Categorization15 on lines $34'_0$–$34'_{15}$, respectively.

Module 62' is fed the categorizations on lines $34'_0$–$34'_{15}$ and uses the categorization selection on line 66' (provided by the encoder 9 on line 66) to selects one of the categorizations on line $34'_0$–$34'_{15}$ for coupling to line 34'. For each region, module 40' determines the transform coefficient reconstruction level table, the vector dimension, and a variable bit-length decoding table in accordance with the category assignments for each region on line 34'. Then, module 40' decodes the bits on line 61' using the variable bit-length decoding table and reconstructs the transform coefficients using the transform coefficient reconstruction table and the region power quantization levels on line 31'.

Figure 6:
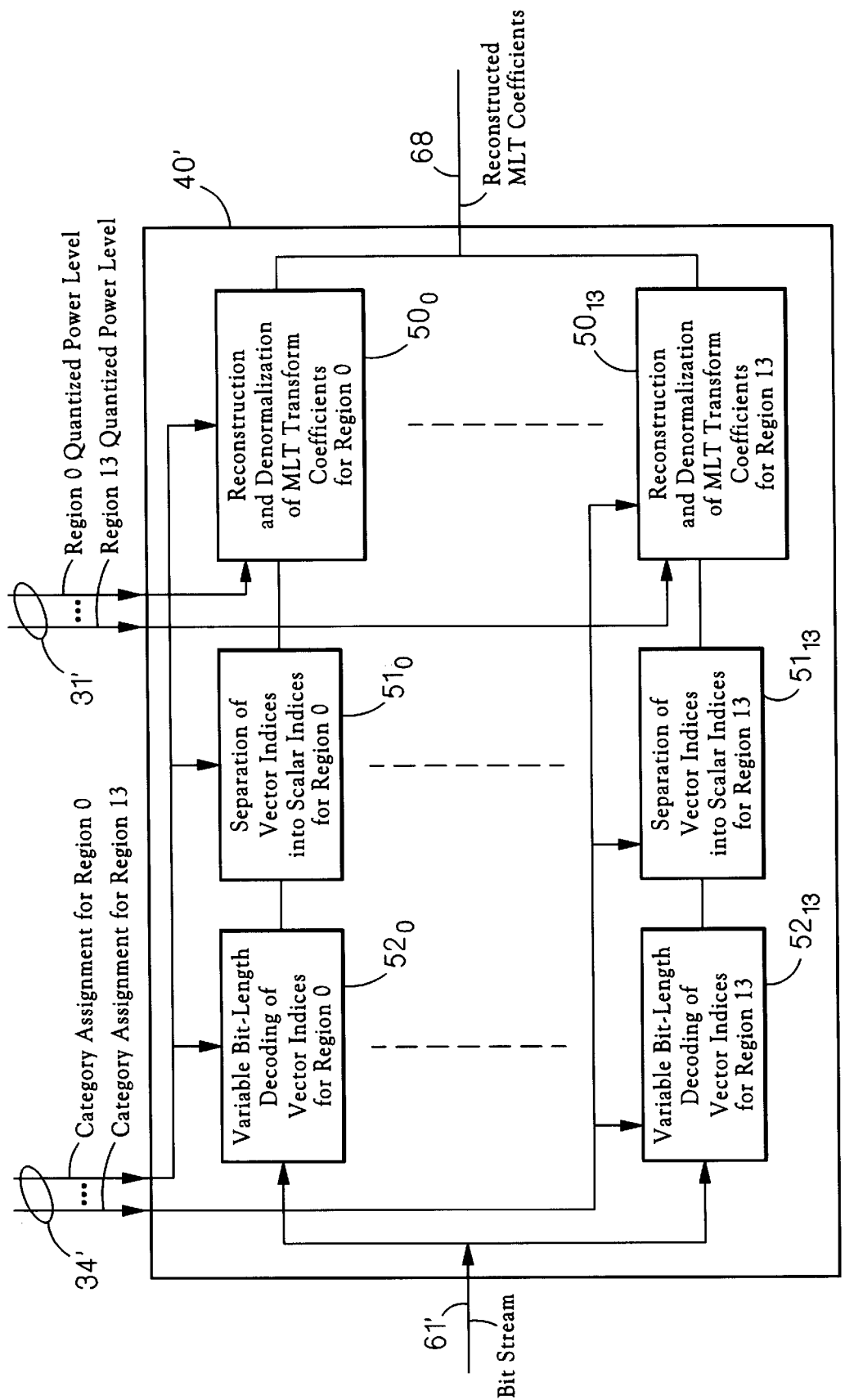
FIG. 6 is a block diagram a variable bit-length decoding and MLT reconstruction module used in the decoder of FIG. 5.

Referring to FIG. 6, module 40' takes the bit stream on line 61' and decodes the vector indices in regions 0–13 sequentially in modules $52'_0$–$52'_{13}$, respectively, in accordance with the category assignments on line 34'. Modules $51'_0$–$51'_{13}$ separate the vector indices into scalar indices for each region in accordance with the category assignments on line 34'. Modules $50'_0$–$50'_{13}$ reconstruct and denormalize the MLT transform coefficients for regions 0–13, respectively, in accordance with: the scalar indices produced by modules $51'_0$–$51'_{13}$, respectively; the category assignments on line 34'; and, the region quantization power levels on line 31' to produce the reconstructed MLT transform coefficients for the frame on line 68.

Referring again to FIG. 5, the transform coefficients are transformed into a time domain audio signal in inverse MLT (IMLT) module 16' and digital to analog (D/A) converter 14'.

It should be noted that some regions may be assigned to category 7, which means that no specific MLT information was transmitted for these regions. However, the average MLT magnitude for these regions is available (i.e., the square root of the quantized average power). Instead of setting these transform coefficients to 0, the decoder will set them to a value proportional to the average MLT transform coefficient magnitude for each region (equal to the square root of the quantized mean power in the region) and the signs will be set randomly. This is called noise fill. Noise fill also will be used for categories 6 and 5, because for these categories most of the MLT transform coefficients get quantized to 0. The values which were transmitted as 0s are set to small fractions of the average magnitude for the region. Again, the signs are determined randomly.

For those transform coefficients which are coded, centroid reconstruction tables for each category are provided for decoding. The decoded values are then renormalized using the square root of the quantized mean power in the region.

The 40 MLT transform coefficients which represent frequencies above 7000 hz are set to 0. After the MLT transform coefficients are reconstructed, an INVERSE MODULATED LAPPED TRANSFORM (IMLT) 16' generates 320 new time domain samples on line 70. The samples on line 70 are converted into the audio signal on line 72 by a digital to analog (D/A) converter 14'. Decoder 30 operation for each frame of MLT information is independent of information in the previous frame except for the final overlap and add operation in the IMLT 16'.

More particularly:

DECODING THE POWER AMPLITUDE ENVELOPE (Module 22')

The first 5 bits of the frame of data on line 46' are assembled into rms_index[0]. Then, for regions 1 through 13, the variable bit-length codes for differential_rms_index [region] are decoded according to the table differential_rms_table which is defined in the encoder section.

For regions 1 through 13, rms_index[region]=rms_index[region−1]+differential_rms_index[region];

CATEGORIZATION PROCEDURE (Module 32')

For each frame, after the power amplitude envelope has been decoded, the decoder 30 module 64 computes the number of bits available for representing the MLT transform coefficients.

bits available=bits per frame−amplitude envelope bits−4 rate control bits;

Then module 64 uses the categorization procedure set forth in FIGS. 7A–7C) to reconstruct the same set of 16 possible categorizations that the encoder 9 (FIG. 3) had computed. Finally the 4 rate control bits (i.e., rate control) on line 45' determine the one of the 16 categorizations that was selected by the encoder 9 (FIG. 3) to encode the MLT transform coefficients.

DECODING MIT TRANSFORM COEFFICIENTS (Module 40')

For each region the decoder 30 module 66 decodes the variable bit-length codes for the MLT vectors on line 49' according to the category appropriate table defined in the encoder 30 module 64:

(mlt_sqvh_bitcount_category_x and mlt_sqvh_code_category_x), where x=0 to 6

Then the individual MLT transform coefficient quantization indices, k[i], are recovered from the vector index:

k[i]=(vector_index modulo $(k_{max}+1)^{(i+1)})/(k_{max}+1)^i$
i=[0,vd−1]

where:

vd=vector dimension for category kmax=maximum scalar quantization index for category The default reconstruction for the MLT transform coefficients uses the centroid tables:

| float mlt_quant_centroid[8][14] = { | | | | | | | | | | | | | |
|---|---|---|---|---|---|---|---|---|---|---|---|---|---|
| { 0.0, | 0.392, | 0.761, | 1.120, | 1.477, | 1.832, | 2.183, | 2.541, | 2.893, | 3.245, | 3.598, | 3.942, | 4.288, | 4.724 |
| }, { 0.0, | 0.544, | 1.060, | 1.563, | 2.068, | 2.571, | 3.072, | 3.562, | 4.070, | 4.620, | 0.0, | 0.0, | 0.0, | 0.0 |
| }, { 0.0, | 0.746, | 1.464, | 2.180, | 2.882, | 3.584, | 4.316, | 0.0, | 0.0, | 0.0, | 0.0, | 0.0, | 0.0, | 0.0 |
| }, { 0.0, | 1.006, | 2.000, | 2.993, | 3.985, | 0.0, | 0.0, | 0.0, | 0.0, | 0.0, | 0.0, | 0.0, | 0.0, | 0.0 |
| }, { 0.0, | 1.321, | 2.703, | 3.983, | 0.0, | 0.0, | 0.0, | 0.0, | 0.0, | 0.0, | 0.0, | 0.0, | 0.0, | 0.0 |
| }, { 0.0, | 1.657, | 3.491, | 0.0, | 0.0, | 0.0, | 0.0, | 0.0, | 0.0, | 0.0, | 0.0, | 0.0, | 0.0, | 0.0 |
| }, { 0.0, | 1.964, | 0.0, | 0.0, | 0.0, | 0.0, | 0.0, | 0.0, | 0.0, | 0.0, | 0.0, | 0.0, | 0.0, | 0.0 |
| }, { 0.0, | 1.958, | 0.0, | 0.0, | 0.0, | 0.0, | 0.0, | 0.0, | 0.0, | 0.0, | 0.0, | 0.0, | 0.0, | 0.0 |
| }}; | | | | | | | | | | | | | |

The MLT transform coefficient amplitudes are reconstructed in module 66 by taking the product of the square root of the quantized average power in the region with the centroid specified by the decoded index.

Non-zero values are then negated if the corresponding sign bit is set to 1.

NOISE FILL

For category 7, no MLT transform coefficient amplitudes are encoded. For categories 5 and 6 the quantization step sizes are so large that most MLT transform coefficients are coded as 0. The decoder replaces these 0's with values of random sign and amplitude proportional to the square root of the quantized average power for the region. The default proportionality constants are category default noise-fill proportionality constant 5 0.176777
6 0.25
7 0.707107

INSUFFICIENT BITS

There may be frames for which the encoder runs out of bits before it finishes coding the last non-category 7 region. The default decoder action in these cases is to process that region and all remaining regions as category 7.

INVERSE MODULATED LAPPED TRANSFORM (IMLT) (Module 16')

Each Inverse Modulated Lapped Transform (IMLT) 68 operation takes in 320 MLT transform coefficients and produces 320 time domain audio samples. The inverse MLT 68 can be decomposed into a type IV DCT followed by a window, overlap and add operation. The type IV DCT is:

u[n]=SUM m=[0,319]
sqrt(2/320)*cos((m+0.5)*(n+0.5)*PI/320)*mlt[m]

WINDOWING

The window, overlap and add operation uses half of the samples from the current frame's DCT output with half of those from the previous frame's DCT output:

y[n]=w[n]*u[159−n]+w[319−n]*u_old[n], n=[0,159]
y[n+160]=w[160+n]*u[n]−w[159−n]*u_old[159−n], n=[0,159]

For the next frame, the so far unused half of u[] is stored in u_old[]:

u_old[n]=u[n+160], n=[0,159]

Attached hereto as an APPENDIX is a source code program in C Programming Language containing the encoder, decoder and initialization modules. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Other embodiments are within the spirit and scope of the appended claims.

What is claimed is:

1. A method for encoding an audio signal, comprising the steps of:
    converting overlapping groups of digitized samples of the audio signal into frames of transform coefficients;
    grouping the transform coefficients in each frame into adjacent regions;
    determining power in each region from the transform coefficients in the region;
    deriving a plurality of categorizations to the transform coefficients, each categorization specifying, for each region, a predetermined rule for performing a scalar, non-uniform quantization with a predetermined step size; grouping a predetermined number of quantization scalars to form vectors; and performing statistically based variable-bit length encoding of the vectors;
    determining, for each one of the categorizations, the number of bits required to transmit the encoded transform coefficients to a decoder;
    quantizing and encoding the transform coefficients in accordance with one of the categorizations selected in accordance with a predetermined fidelity criteria and maximum bit rate;
    transmitting the quantized power, the quantized and encoded transform coefficients, and an identification of the selected one of the categorizations to a decoder.

2. A method for decoding an encoded audio signal, comprising the steps of:
    reconstructing power in each of a plurality of regions from quantized and encoded power;
    determining one of a predetermined number of quantization and statistically based variable bit-length encoding categorizations used by the encoder from a received identification thereof, each categorization specifying, for each region, a predetermined rule for performing a scalar, non-uniform quantization with a predetermined step size;

grouping a predetermined number of Quantization scalars to form vectors;

Performing statistically based variable-bit length encoding of the vectors;

determining a quantization step size for each region from the determined categorization and the quantized power;

reconstructing from the quantized and encoded transform coefficients, reconstructed transform coefficients using the determined step size; and transforming the reconstructed transform coefficients into the audio signal.

3. An audio signal encoding method, comprising the steps of:

converting samples of the audio signal into frames of transform coefficients, the transform coefficients in each frame being grouped into a plurality of regions;

deriving a plurality of categorizations to the transform coefficients, each categorization specifying, for each region, a predetermined rule for performing a scalar, non-uniform quantization with a predetermined step size; grousing a predetermined number of quantization scalars to form vectors; and performing statistically based variable-bit length encoding of the vectors;

selecting one of the categorizations for quantization of the transform coefficients in the regions.

4. An audio signal encoding method, comprising the steps of:

converting samples of the audio signal into frames of transform coefficients, the transform coefficients in each frame being grouped into a plurality of regions;

determining a power for each of the regions from the transform coefficients;

encoding the determined powers for transmission to a decoder;

deriving a plurality of categorizations to the transform coefficients, each categorization specifying, for each region, a predetermined rule for performing a scalar, non-uniform quantization with a predetermined step size; grouping a predetermined number of quantization scalars to form vectors; and performing statistically based variable-bit length encoding of the vectors, the transform coefficients of at least one categorization being quantized in accordance with a quantization step size selected in accordance with the determined powers, the encoding procedure being selected in accordance with statistical properties of the quantized transform coefficients;

selecting one of the categorizations for quantizing and encoding of the transform coefficients in the regions in accordance with a figure of merit determined for each of the applied categorizations and identifying such selected categorization for transmission to the decoder;

quantizing the transform coefficients in the regions with the quantization step sizes provided by the categories in the selected categorization;

encoding the quantized transform coefficients in accordance with the procedures provided by the categories in the selected categorization for transmission to the decoder.

5. An audio signal encoding method, comprising the steps of:

converting a sequence of samples of the audio signal into a corresponding sequence of digital words;

converting each of a plurality of overlapping groups of the digital words into a frame of transform coefficients, the coefficients in each frame being grouped into a plurality of adjacent regions;

deriving a plurality of categorizations to the transform coefficients, each categorization specifying, for each region, a predetermined rule for performing a scalar, non-uniform quantization with a predetermined step size; grouping a predetermined number of quantization scalars to form vectors; and performing statistically based variable-bit length encoding of the vectors, such categorization being selected in accordance with at least one characteristics of the transform coefficients in the region; and selecting one of the categorizations for quantizing and encoding of the transform coefficients in each of the regions in accordance with a figure of merit.

6. A method for encoding an audio signal comprising the steps of:

windowing the incoming audio signal;

transforming the windowed signal from the time domain to a frequency domain, the transforming step resulting in a plurality of frequency components;

grouping the frequency components into adjacent regions in the frequency domain, each region having a plurality of frequency components;

determining a spectral energy for each region;

transmitting the spectral energy for each region in an encoded format to a transmission channel;

determining, using said spectral energies for all regions, a quantization step size and statistically based variable bit-length encoding characterizations for each region, each categorization specifying, for each region, a predetermined rule for performing a scalar, non-uniform quantization with a predetermined step size; grouping a predetermined number of Quantization scalars to form vectors; and performing statistically based variable-bit length encoding of the vectors;

quantizing the frequency components based on said quantization determined step size and statistically based variable bit-length encoding characterizations;

determining the total number of bits required to transmit quantized information, in accordance with a transmitter encoding method;

determining a plurality of perturbed quantization assignments for each of said regions based upon a predetermined set of rules, and using said quantization step sizes and statistically based variable bit-length encoding characterizations;

determining, for each perturbed quantization, the total number of bits required to transmit said quantized information in accordance with quantization step sizes resulting from said perturbed assignments;

based upon a fidelity criteria and a maximum channel bit rate, selecting one of said perturbed assignments and said quantization step sizes, for transmission to said channel;

quantizing said transform coefficients in accordance with said selected quantization;

encoding said quantized transform coefficients for transmission to the channel; and transmitting to the channel an identification of the selected quantization, whereby a decoder can reconstruct an audio signal from said received information over the channel.

7. A method for decoding an encoded audio signal comprising the steps of:

reconstructing a power amplitude envelope from a quantized and encoded power amplitude envelope;

determining, from a bit rate code, a selected one of a predetermined number of quantization and statistically based variable bit-length encoding categorizations used in quantizing and encoding the audio signal, each categorization specifying, for each region, a predetermined rule for performing a scalar, non-uniform quantization with a predetermined step size; grouping a predetermined number of quantization scalars to form vectors; and performing statistically based variable-bit length encoding of the vectors; such quantization procedure having grouped transform coefficients of a frame of the audio signal into adjacent regions, the transform coefficients in each region having been quantized in accordance with a quantization step size selected in accordance with quantized transmitted power in such region and the quantized transmitted powers in all the regions and a predetermined rule;

decoding the quantized and encoded transform coefficients in accordance with the selected one of the categorizations, such selected categorization providing the quantization step size and encoding categorization used to encode the transform coefficients of the audio signal; and converting the decoded transform coefficients into a reconstruction of the audio signal.

8. A method for encoding and decoding an encoded audio signal, the audio signal encoding method comprising the steps of:
converting overlapping groups of digitized samples of the audio signal into frames of transform coefficients;
grouping the frames of transform coefficients into adjacent regions;
determining power in each region from the transform coefficients in the region;
transmitting the power quantized and encoded to a decoder;
applying a predetermined number of quantization step size and statistically based variable bit-length encoding procedure categorizations to the transform coefficients in each region, each categorization specifying, for each region, a predetermined rule for performing a scalar, non-uniform Quantization with a predetermined step size; grouping a predetermined number of quantization scalars to form vectors; and performing statistically based variable-bit length encoding of the vectors, the quantization step size being selected in accordance with quantized transmitted power in the region and the quantized transmitted powers in all the regions;
determining the number of bits required to transmit the encoded transform coefficients to a decoder;
quantizing and encoding the transform coefficients in accordance with a quantization procedure selected in accordance with a predetermined fidelity criteria and maximum bit rate; and
transmitting the selected quantized and encoded transform coefficients and an identification of the selected quantization procedure to a decoder;

the decoding method comprising the steps of:
reconstructing a power amplitude envelope from the transmitted quantized and encoded power amplitude;
determining one of a predetermined number of quantization and encoding categorizations applied to the transmitted to the decoder;
decoding quantized and encoded transform coefficients in accordance with the determined categorization, such determined categorization providing the quantization step size and encoding categorization in encoding the audio signal; and
converting the decoded transform coefficients into a reconstructed audio signal.

9. An audio signal encoding method, comprising the steps of:
converting overlapping groups of the digitized samples of an audio signal into frames of transform coefficients, each frame of transform coefficients being grouped into regions;
determining power in each region quantized, indexed, and variable bit-length encoded;
performing a quantization and statistically based variable-bit length encoding categorization procedure to determine a predetermined number of categorizations using the quantized region power indices and a number of remaining bits remaining after region power encoding, each categorization specifying a quantization and encoding category assignment for each region, each category defining a quantization step size, dead zone, vector dimension, and variable bit-length coding table and associated decoding tables;
for each categorization, selecting the quantization and encoding category for each region in accordance with the quantized power indices in the region, the quantized power indices in all the regions, and the number of available bits;
determining the number of bits required to transmit the encoded transform coefficients using each categorization;
encoding the transform coefficients using one of the categorizations selected in accordance with a maximum bit rate criteria;
transmitting the encoded quantized region power indices, an identification of the selected categorization, and the encoded transform coefficients to a decoder.

10. The method recited in claim 9, including the steps of:
decoding and reconstructing quantized power in each of the regions is from the transmitted quantized power indices;
determining the same set of categorizations that the encoder determined and using the quantized power indices and the number of bits remaining after region power decoding;
determining the selected one of the categorizations from the identification thereof transmitted to the decoder;
determining the quantization and encoding category assignment for each of the regions from the determined categorization;
determining for each region, from the determined category for the region and the reconstructed quantized power in the region, a transform coefficient reconstruction level table, the vector dimension, and a variable bit-length decoding table;
reconstructing the quantized transform coefficients for each region from the transform coefficient reconstruction level table, the vector dimension, and the variable bit-length decoding table; and
transforming into a time domain audio signal the transform coefficients.

11. A encoder for encoding an audio signal, comprising:
a module for converting overlapping groups of digitized samples of the audio signal into frames of transform coefficients;

a module for grouping the transform coefficients in each frame into adjacent regions;

a module for determining power in each region from the transform coefficients in the region;

a module for deriving a plurality of categorizations to the transform coefficients, each categorization specifying, for each region, a predetermined rule for performing a scalar, non-uniform quantization with a predetermined step size; grouping a predetermined number of quantization scalars to form vectors; and performing statistically based variable-bit length encoding of the vectors;

a module for determining, for each one of the categorizations, the number of bits required to transmit the encoded transform coefficients to a decoder;

a module for quantizing and encoding the transform coefficients in accordance with one of the categorizations selected in accordance with a predetermined fidelity criteria and maximum bit rate;

a module for transmitting the quantized power, the quantized and encoded transform coefficients, and an identification of the selected categorizations to a decoder.

12. A decoder for decoding an encoded audio signal, comprising:

a module for reconstructing power in each of a plurality of regions from quantized and encoded power;

a module for determining one of a predetermined number of quantization and statistically based variable bit-length encoding categorizations used by the encoder from a received identification thereof, each categorization specifying, for each region, a predetermined rule for performing a scalar, non-uniform quantization with a predetermined step size; grouping a predetermined number of quantization scalars to form vectors; and performing statistically based variable-bit length encoding of the vectors;

a module for determining a quantization step size for each region from the determined categorization and the quantized power;

a module for reconstructing from the quantized and encoded transform coefficients, reconstructed transform coefficients using the determined step size; and a module for transforming the reconstructed transform coefficients into the audio signal.

13. An audio signal encoder, comprising:

a module for converting samples of the audio signal into frames of transform coefficients, the transform coefficients in each frame being grouped into a plurality of regions;

a module for deriving a plurality of categorizations to the transform coefficients, each categorization specifying, for each region, a predetermined rule for performing a scalar, non-uniform quantization with a predetermined step size; grousing a predetermined number of quantization scalars to form vectors; and performing statistically based variable-bit length encoding of the vectors, such categorizations being selected in accordance with characteristics of the transform coefficients in the region;

a module for selecting one of the categorizations for quantization of the transform coefficients in the regions.

14. A decoder for decoding an encoded audio signal comprising:

a module for reconstructing a power amplitude envelope from a quantized and encoded power amplitude envelope;

a module for determining, from a bit rate code, a selected one of a predetermined number of statistically based variable bit-length encoding categorizations used in quantizing and encoding the audio signal, each categorization specifying, for each region, a predetermined rule for performing a scalar, non-uniform quantization with a predetermined step size; grouping a predetermined number of quantization scalars to form vectors; and performing statistically based variable-bit length encoding of the vectors, such quantization procedure having grouped transform coefficients of a frame of the audio signal into adjacent regions, the transform coefficients in each region having been quantized in accordance with a quantization step size selected in accordance with quantized transmitted power in such region and the quantized transmitted powers in all the regions and a predetermined rule;

a module for decoding the quantized and encoded transform coefficients in accordance with the selected one of the categorizations, such selected categorization providing the quantization step size and encoding categorization used to encode the transform coefficients of the audio signal; and a module for converting the decoded transform coefficients into a reconstruction of the audio signal.

15. An encoding and decoding system for encoding and decoding an audio signal, comprising:

encoder, comprising:

a module for converting overlapping groups of digitized samples of the audio signal into frames of transform coefficients;

a module for grouping the frames of transform coefficients into adjacent regions;

a module for determining power in each region from the transform coefficients in the region;

a module for transmitting the power quantized and encoded to a decoder;

a module for applying a predetermined number of quantization step size and statistically based variable bit-length encoding procedure categorization to the transform coefficients in each region, each categorization specifying, for each region, a predetermined rule for performing a scalar, non-uniform quantization with a predetermined step size; grouping a predetermined number of quantization scalars to form vectors; and performing statistically based variable-bit length encoding of the vectors, the quantization step size being selected in accordance with quantized transmitted power in the region and the quantized transmitted powers in all the regions;

a module for determining the number of bits required to transmit the encoded transform coefficients to a decoder;

a module for quantizing and encoding the transform coefficients in accordance with a quantization procedure selected in accordance with a predetermined fidelity criteria and maximum bit rate; and a module for transmitting the selected quantized and encoded transform coefficients and an identification of the selected quantization procedure to a decoder;

the decoder, comprising:

a module for reconstructing a power amplitude envelope from the transmitted quantized and encoded power amplitude;

a module for determining one of a predetermined number of quantization and encoding categorizations applied to the transmitted to the decoder;

a module for decoding quantized and encoded transform coefficients in accordance with the determined categorization, such determined categorization providing the quantization step size and encoding categorization in encoding the audio signal; and a module for converting the decoded transform coefficients into a reconstructed audio signal.

16. A method for encoding an audio signal, comprising the steps of:

converting overlapping groups of digitized samples of the audio signal into frames of transform coefficients;

grouping the transform coefficients in each frame into adjacent regions;

determining power in each region from the transform coefficients in the region;

deriving a plurality of categorizations to the transform coefficients, each categorization specifying, for each region, a predetermined rule for performing a scalar quantization with dead zone expansion having a predetermined step size; grouping a predetermined number of quantization scalars to form vectors; and performing statistically based variable-bit length encoding of the vectors;

determining, for each one of the categorizations, the number of bits required to transmit the encoded transform coefficients to a decoder;

quantizing and encoding the transform coefficients in accordance with one of the categorizations selected in accordance with a predetermined fidelity criteria and maximum bit rate;

transmitting the quantized power, the quantized and encoded transform coefficients, and an identification of the selected one of the categorizations to a decoder.

* * * * *